United States Patent [19]

Perreira et al.

[11] Patent Number: 5,244,300
[45] Date of Patent: Sep. 14, 1993

[54] STRUCTURAL CONNECTOR APPROXIMATING A CONE OF ELLIPTICAL CROSS-SECTION

[75] Inventors: Noel D. Perreira, Bethlehem; B. Vincent Viscomi, Easton; Robert B. Fleischman, Bethlehem, all of Pa.

[73] Assignee: Lehigh University, Bethlehem, Pa.

[21] Appl. No.: 662,611

[22] Filed: Feb. 28, 1991

[51] Int. Cl.$^5$ .............................................. F16B 2/00
[52] U.S. Cl. .................................... 403/381; 403/263; 403/331; 403/333; 403/409.1; 52/594
[58] Field of Search ............... 403/381, 189, 187, 230, 403/252, 254, 262, 263, 331, 49, 403, 382, 334, 333, 340, 339, 374, 409.1; 52/726, 730, 738, 251, 252, 594

[56] References Cited

U.S. PATENT DOCUMENTS

| | | | |
|---|---|---|---|
| 733,500 | 7/1903 | Moore | 403/381 X |
| 1,662,438 | 3/1928 | Reinhold | |
| 2,008,087 | 7/1935 | Stromberg | |
| 2,231,297 | 2/1941 | Saxe | |
| 2,374,550 | 4/1945 | McIntosh | |
| 2,540,408 | 2/1951 | Saxe | |
| 2,624,429 | 1/1953 | Saxe | |
| 2,962,170 | 11/1960 | Best | 403/187 X |
| 3,017,972 | 1/1962 | Saxe | |
| 3,022,871 | 2/1962 | Saxe | |
| 3,025,936 | 3/1962 | Saxe | |
| 3,037,593 | 6/1962 | Webster | 403/381 X |
| 3,082,555 | 3/1963 | Hill | 403/381 X |
| 3,097,729 | 7/1963 | Saxe | |
| 3,685,866 | 8/1972 | Patenaude | |
| 3,938,297 | 2/1976 | Sato et al. | 403/189 X |
| 4,019,298 | 4/1977 | Johnson IV | 403/381 X |
| 4,220,419 | 9/1980 | Hawes | |
| 4,443,985 | 4/1984 | Moreno | 52/252 X |
| 4,586,350 | 5/1986 | Mullin | |
| 4,684,285 | 8/1987 | Cable | 403/333 X |
| 4,867,598 | 9/1989 | Winter | 403/331 X |
| 4,895,548 | 1/1990 | Holland et al. | 403/334 X |

FOREIGN PATENT DOCUMENTS 905078 7/1972 Canada .................. 403/381
2106611 4/1983 United Kingdom ................ 403/381

OTHER PUBLICATIONS

Feb. 28-Mar. 1, 1990, National Science Foundation—Engineering Research Center Symposium: "A Partnership for Competitiveness", Inventor Noel Duke Perriera presented an unpublished lecture.

C. Chasten, R. Fleischman, L. Lo, and G. Driscoll, "Semi-Rigid Steel Connections and Their Effects on Structural Steel Frames", ATLSS Report 87-02, Lehigh University, May 1987.

C. Doydum and N. Perriera, "Select Theory for Part Dimensions; Tolerances, and Equipment Precision: A Prelude to Automated Construction Systems," ATLSS Report No. 89-14, Lehigh University, Sep. 1989.

C. Dydum and N. Perreira, "A Method for Selecting Dimensions, Tolerances and Precisions for Alignment," preprint of Article Accepted for Publication in the *International Journal of Production Research* dated Sep. 10, 1990 presented at the 16th ASME Design Automation Conference, Chicago, Il. Sep. 1990.

C. Doydum and N. Perreira, "Use of Monte Carlo Simulation to Select Dimensions, Tolerances and Precision for Automated Assembly", preprint of Article accepted for publication in the *Journal of Manufacturing Systems*, dated Nov. 1990.

(List continued on next page.)

Primary Examiner—Randolph A. Reese
Assistant Examiner—Harry C. Kim
Attorney, Agent, or Firm—Ratner & Prestia

[57] ABSTRACT

A structural connector used to interconnect at least a first and a second member which includes a cone-shaped male part having an approximately elliptical cross-section attached to the first member and a female part forming a correspondingly elliptical cone-shaped cavity attached to the second member and adapted to receive the male part, whereby upon receipt of the male part within the cavity of the female part the first and second members are interconnected.

27 Claims, 18 Drawing Sheets

OTHER PUBLICATIONS

C. Doydum and N. Perreira, "Selection of Dimensions Tolerances and Precision for Automated Assembly of Pegs and Heles", Transactions of the North American Manufacturing Research Institution of SME, pp. 371–378, paper presented at NAMRC XVIII, Pa. State University, University Park, Pa. May 1990.

R. Fleischman, B. Viscomi and L. Lu, "ATLSS Connections—Concept, Development and Experimental Investigation", ATLSS Report No. 91-02, Length 11. Jan. 1991.

M. Groover, N. Perreira, C. Doydum and R. Smith, "A Survey of Robotics Technology in Construction", ATLSS Report No. 87-04, Lehigh University Aug. 1987.

V. Nguyen and N. Perreira, "A Chamfered Connection for Use in Automated Framing of Buildings", ATLSS Report No. 88-06 Lehigh University Aug. 1987.

V. Nguyen, "A Study of Chamfered Connection for Use in Automated Framing of Building" A Masters Thesis, Lehigh University, Jun. 1988.

V. Saxe, "A Manual for Structural Welding Practice", Saxe Welded Connections, Baltimore, MD. 1964.

D. Whitney, "Quasi-Static Assembly of Compliantly Supported Rigid Parts," *Journal of Dynamic Systems, Measurement & Control*, vol. 104, pp. 65–77, Mar. 1982.

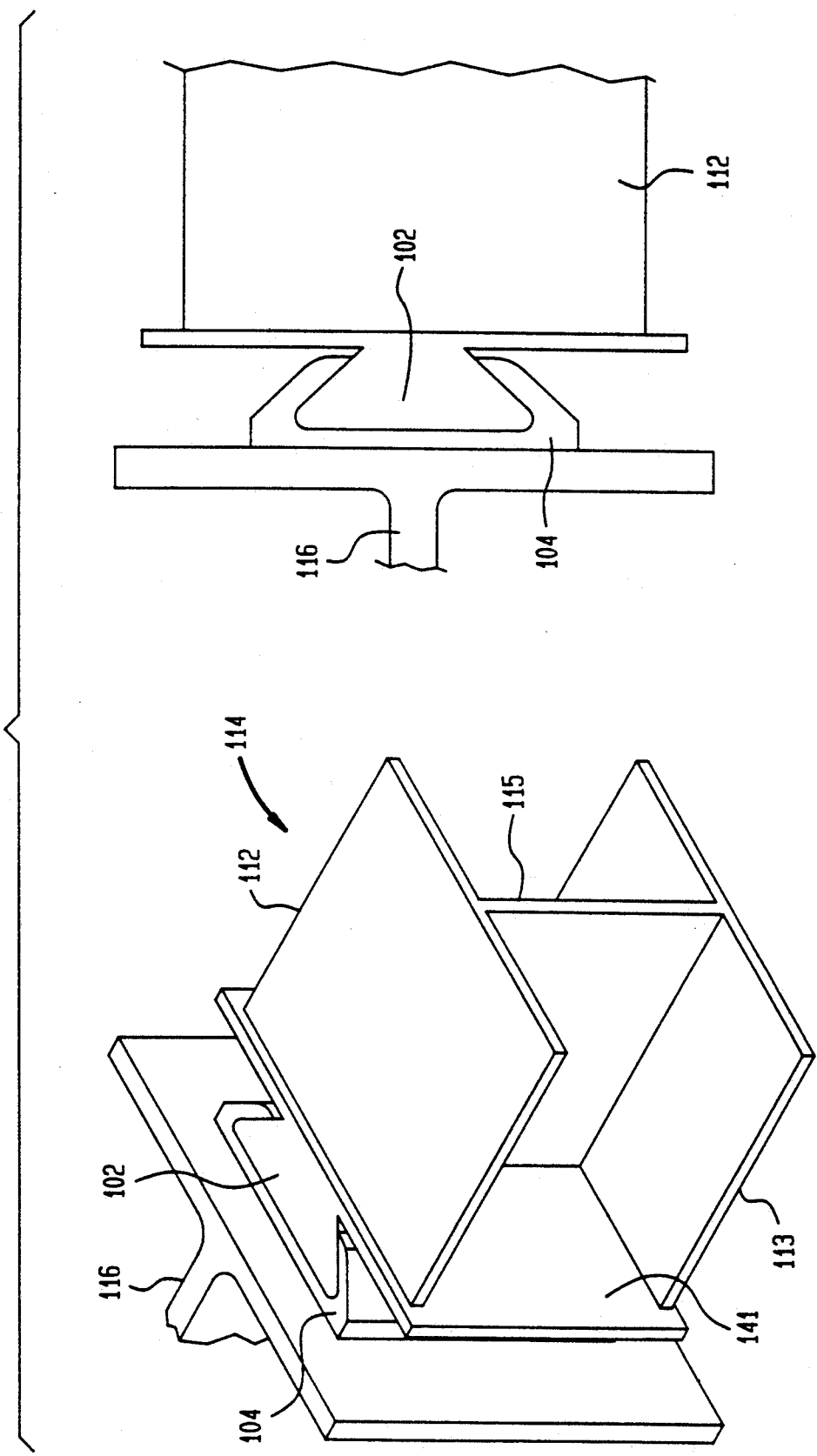

STRUCTURAL CONNECTOR APPROXIMATING A CONE OF ELLIPTICAL CROSS-SECTION

FIELD OF THE INVENTION

This invention relates to an improved structural connector used to interconnect both two structural members to form a structural frame and non-structural members to structural members. More particularly, the invention is a class of structural connectors which physically approximate a cone of elliptical cross-section and are characterized by three-dimensional wedges.

BACKGROUND OF THE INVENTION

Connectors are used in many different industries, including building construction and mechanical and electrical equipment manufacture, to align and secure components. Such connectors may interconnect two structural members to form a structural frame which can be used as a load-bearing member for such applications as bridges, buildings, mounts for equipment and containers like pressure vessels, and assemblies of electrical and mechanical systems. The structural members to be connected may have various geometries, including flat and curved plates, ribs, struts, beams, girders, and columns, and may be made of steel, reinforced concrete, or composites of plastic, wood, steel and other materials.

As frames are erected, the structural members are positioned, aligned, and secured to each other using connectors. Connectors are also used to attach non-structural members, which include walls, facade, and other non-load bearing members, to the structural members. For either use, the connectors offer temporary or permanent attachment as desired.

Input from at least five different specialists within the construction industry is required to create structural frames. Architects determine the general form of the structure; steel mills produce the structural members with various nominal sizes; structural design engineers determine and select the nominal sizes of the structural members and the types of connectors required to make the frames which will allow the architectural form to sustain its loads and deflections; fabricators detail the connectors selected by the engineers, cut the structural members to the correct size, make or obtain the components of the connectors, and attach the connectors to the structural members (typically away from the erection site); and erectors take the fabricated elements and assemble them into a structural frame at the erection site.

Most structures include beams, columns, and girders which are welded or bolted to other members at their ends or mid-sections using connectors. The design engineer may choose from a variety of connector types: simple (shear), semi-rigid (partial-moment), and rigid (full-moment). A simple connector can withstand shear loads. It allows rotation, so that little or no moment is transferred between connected elements through the connector. A rigid connector transfers both shear and moment loads between connected elements allowing no relative rotation between the members. The current practice is to use simple or rigid connectors; semi-rigid connectors are atypical. The engineer determines the size of the loads that each connector will bear and the allowable deflections and rotations allowed at each connector. Using that information and the appropriate structural design codes and practices, the engineer chooses suitable structural elements and connectors.

The fabricator or, more specifically, the detailer who works for the fabricator, uses the design information and knowledge of both the manufacturing capabilities of the fabrication shop and the abilities of the erectors to detail each connector. Typically, a connector includes a number of components. The connector detail allows the fabricator to attach (by a combination of one or more cutting, drilling, welding, and bolting operations) the plates and other components of the connector to the beams, columns, and girders to be connected. Thus, the fabricator attaches certain components of a connector to one structural member at the shop and away from the erection site. Other components of the same connector may either be attached to a second structural member at the shop or shipped loose.

At the erection site, final assembly requires the erectors to pre-position and align the joining members, temporarily secure the connectors, plumb the structure, and make the connections permanent. Erectors attach the separate components of the connectors, usually by welding, bolting, or both. Typically, the structural members will not fit together properly without on-site modification. Such modifications are required by tolerance build-up within the structure, improperly fabricated members, improperly erected portions of the frame, or a combination of these problems.

Because modifications are required on-site, the common practice is to detail connectors which allow a temporary connection. Such a connection allows the members of the structure to be moved with sledge hammers, prying devices, and guy lines. Typically, temporary connection requires the use of a drift pin. In some cases, the drift pin is temporarily removed when a third structural member is connected to two members which have already been temporarily connected. Removal of the drift pin places the structure in an unstable position. This can be especially hazardous because the erector may be sitting on or suspended by one of the temporarily connected members.

The frame structure is usually assembled one floor at a time, although other groups of members may be used. A portion of the frame is first erected by making temporary connections between the main members, usually the vertical columns and horizontal beams or girders that interconnect those columns, of the frame. After the temporary connections are complete, the structure is made plumb using guy lines and shims placed in the connections to shift the positions of the beams and columns. Once plumb to within required tolerances, usually about one inch per floor, the connectors are permanently bolted or welded.

Bolted connectors are preferred by most construction companies because bolting is more easily done than welding at the erection site. Numerous bolt holes must be aligned at each of the connectors to bolt the members together. If alignment is impossible, old holes are enlarged or new holes are drilled. The bolts are then inserted into the aligned bolt holes and nuts are used to tighten them. Care must be exercised when tightening the bolts. Overtightening may stress the bolts and cause them to fail; overly loose bolts will cause the connector to slip. In either case, the connector will not function as designed.

Although not preferred, welded connectors are used. Welding is most typically done off-site at the fabrication shop because off-site welding is far cheaper than on-site welding, which is for that reason avoided whenever possible. In some cases, however, especially when rigid connectors are required, welding is done on site. Careful preconditioning of the weld area is essential to weld a structure. In particular, preheating of the members to be connected is necessary when welding many types of steel members. The connected members must meet tight tolerances to assure proper weld strength and toughness. The process of welding also requires highly trained labor and transport of awkward equipment through an inhospitable environment.

The prior art has included connector assemblies designed to assist in the on-site bolting and welding processes. Most of these assemblies incorporate slip-in-place components. Although ingenious, such assemblies have not been successfully implemented in the construction industry. That failure is attributable to a variety of reasons.

In 1928, Reinhold patented (U.S. Pat. No. 1,662,438) a clip device for temporarily supporting structural members used in buildings preparatory to welding. That device is dangerous if the beam moves longitudinally. Moreover, lateral movement of the clip would risk injury to the erector.

Stromberg patented (U.S. Pat. No. 2,008,087) a slide-in-place assembly including a plate or tongue and a supporting socket in 1932. The components fit tightly; the assembly does not allow adjustment of the members. Therefore, it is nearly impossible to attach the large members within the tolerances involved in building construction. This is especially true because both ends of a member must be placed and seated simultaneously using the assembly. If play were introduced into the assembly, the connection would no longer be rigid.

In 1945, McIntosh patented (U.S. Pat. No. 2,374,550) a stepped joint for connecting structural framework such as beams, girders, and columns. That joint does not address the problem of securing the members without bolting or welding. The joint is also eccentric and irregular, which invites structural problems. Moreover, the energy required to cold form the tongue after insertion in the slot either limits the connecting members to thin gauges or demands large amounts of energy. The latter risks local damage and weakening of the connector and structure.

In a series of patents (U.S. Pat. Nos. 2,231,297; 2,540,408; 2,624,429; 3,097,729; 3,017,972; 3,022,871; 3,025,936) between 1941 and 1963, Saxe disclosed a connector applied well below the center of gravity of the connected member. This device was used for temporarily supporting structural members before welding. Such an application tends to make the connection unstable. Moreover, the original design lacked adjustment capability. Although a later version provided for longitudinal adjustment, the failure of that version to assure lateral straightness renders it unsuccessful.

In 1972, Patenaude patented (U.S. Pat. No. 3,685,866) a support socket and wedge combination connector. That connector lacked any type of adjustment, required lots of material to construct, and provided a complex configuration for only shear transfer. Recently, in 1980, Hawes patented (U.S. Pat. No. 4,220,419) an improved connector for continuous beam welded steel structures. The disclosed connector does not attach to the web of the beam and, accordingly, has shortcomings as a full moment connector. Finally, Mullin patented (U.S. Pat. No. 4,586,300) an apparatus including a slot and wedge in 1986. That apparatus can only be applied, however, in light, temporary construction.

To overcome the shortcomings of existing connector assemblies, a new connector is provided. An object of the present invention is to provide an improved connector which will simplify the construction process. Related objects are to (1) permit the components of the connector to be attached to the members to be connected in the fabrication shop, (2) allow connection of the members without requiring bolting or welding, (3) provide connector components which can be easily engaged with minimal effort or force, and (4) reduce the detrimental effects of poor tolerances on the erection process.

Another object is to provide a connector which is flexible and versatile. Related objects are to provide a connector which can carry shear alone, shear and a partial moment, or shear and a full moment; allows adjustment of the connector components; and will temporarily or permanently fix members together. It is still another object of the present invention to provide a connector which is self-centering and self-aligning.

An additional object is to improve the safety features of existing connectors. That object is achieved by designing the connector for location at one end or a midpoint of a member along its center of gravity. Such a design assures a stable connection and helps to avoid danger to erectors. A related object is to provide a connector which can be assembled without damage to or weakening of either the connector or the members to be connected.

Yet another object of the invention herein disclosed and claimed is to provide a connector which is sufficiently compatible with the members to be connected that any desired field welds are simply and easily formed. Further aims are to provide a connector which is strong, durable, and dependable; inexpensive to manufacture; relatively compact and simple in design; and can be used with members of varying proportions.

SUMMARY OF THE INVENTION

To achieve these and other objects, and in view of its purposes, the present invention provides a structural connector, used to interconnect at least a first and a second member, which includes a cone-shaped male part having an approximately elliptical cross-section attached to the first member and a female part forming a correspondingly elliptical cone-shaped cavity attached to the second member and adapted to receive the male part, whereby upon receipt of the male part within the cavity of the female part the first and second members are interconnected.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing, in which:

FIG. 2b provides detailed top, side, front, and bottom views of the cone-shaped object, or male part, of the keystone connector shown in FIG. 2a;

FIG. 2c provides detailed top, side, front, and bottom views of the cone-shaped cavity, or female part, of the keystone connector shown in FIG. 2a;

FIG. 2d provides perspective and top views of the keystone connector shown in FIG. 2a with the male part (shown in FIG. 2b) and female part (shown in FIG. 2c) completely engaged;

DETAILED DESCRIPTION OF THE INVENTION

The connector of the present invention consists of two complimentary parts, a female part and a male part, each secured to one of two members to be connected. In the preferred embodiment, the male and female parts are secured to the members in the fabrication shop. The female part is positioned either at one end or at a midpoint of a column with the complementary male part located at one end of a beam when the connector is used to construct a building. Typically, the column is fixed at its end opposite the connector, and possibly at its midpoint, to the ground or other portions of the building structure. The beam is then moved, by equipment or the erectors, to engage the fixed column. Thus, the male part is placed within the female part, usually at the erection site, and a connection is formed. In a common application, more than one connection is formed simultaneously.

The male and female parts are designed to carry shear and moments. Various embodiments can carry shear alone, shear and a partial moment, or shear and a full moment. In order to carry vertical shear, the connector uses the contact surfaces between the male and female parts. More particularly, the female part has a varying cross-section along the vertical axis and tapers in the horizontal plane to carry the loads properly and efficiently. If a partial moment restraint is desired, the wedging action of the male part creates a horizontal couple and, hence, moment restraint. Accessories, which are ancillary to the present invention, are used at the flanges to develop a full moment without detracting from the ease of erection.

Figure 1:
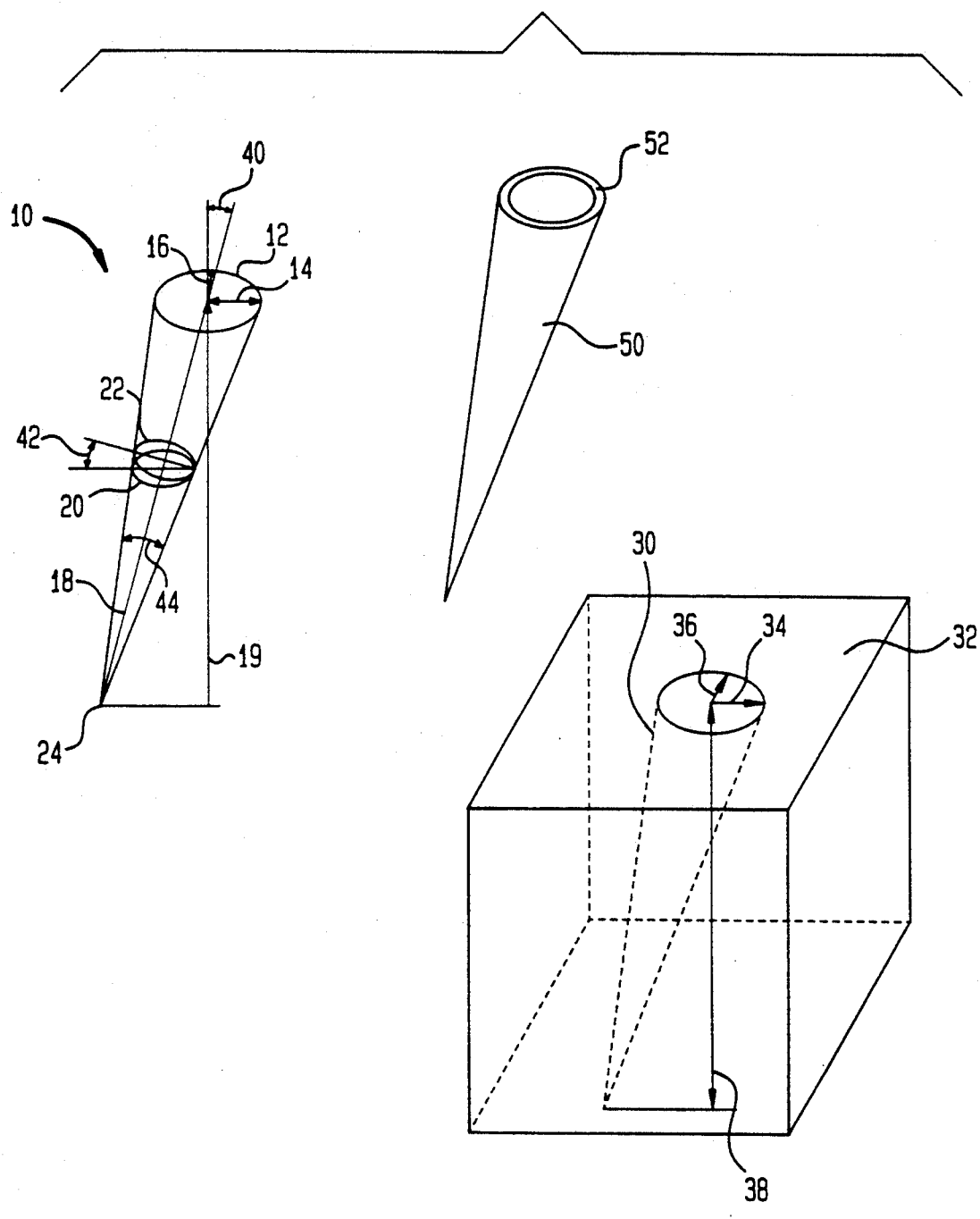
FIG. 1 shows the placement of a cone-shaped object having an elliptic cross-section into a similarly elliptic cone-shaped cavity, the relationship between the object and the cavity illustrating the geometric and force concepts applicable to the various embodiments of the present invention.

FIG. 1 shows the placement of a cone-shaped object 10 having an elliptic cross-section into a similarly elliptic cone-shaped cavity 30. The relationship between object 10 and cavity 30 shown in FIG. 1 illustrates the geometric and force concepts applicable to the various embodiments of the present invention. The ellipse 12 at the top of cone-shaped object 10 has a semi-major axis 14 and a semi-minor axis 16. For a right-elliptic cone, the cone axis 18 is perpendicular to the plane which contains ellipse 12 and the length of axis 18 is equal to the height 19 of the cone. For an oblique cone, as shown in FIG. 1, cone axis 18 is tilted by a tilt angle 40 with respect to the plane containing ellipse 12 and is longer than height 19.

Object 10 may be truncated by passing a cutting plane parallel to ellipse 12, which generates an ellipse 20 at the intersection of object 10 and the cutting plane. If the cutting plane is passed at a cutting angle 42 to ellipse 12, an ellipse 22 is generated at the intersection.

Object 10 can be placed within the cone-shaped cavity 30 formed in block 32. Cavity 30 has a semi-major axis 34, a semi-minor axis 36, and a height 38. The ratio of lengths 14 to 16 to 19 are typically made proportional to the ratio of lengths 34 to 36 to 38. The proportion of lengths associated with object 10 and those of cavity 30 typically are not equal to unity. The embodiments of the invention may use right or oblique, circular or elliptic, truncated or non-truncated cone shapes.

First consider a non-truncated, right, circular cone placed within a similar right, circular cavity. A circular cross-sectioned cone is generated by making the lengths 14 and 16 equal and a circular cross-section cavity is generated by making lengths 34 and 36 equal. A shim cone 50 of thickness 52 may be provided to adjust the height of object 10 relative to cavity 30.

The ease of inserting a cone of arbitrary length into a cavity of equal length is determined by the apex angle 44 and the friction created between surfaces during insertion. Apex angle 44 is defined by the ratio of 14 and 16 to 19 in non-truncated object 10 and 34 and 36 to 38 in cavity 30. In practice, apex angle 44 changes and is a function of the geometry of, and relative coefficients of friction between, object 10 and cavity 30. That angle is chosen to reduce the effects of wedging and jamming while also decreasing the effects of precision and tolerance requirements.

When apex angle 44 is small, it is difficult to locate the top opening of cavity 30 with the point 24 of cone-shaped object 10. Such a geometry would require manual erection methods (not automated erection systems), precise equipment, and tight tolerances in fabrication methods. Moreover, after insertion is begun any angular misalignment of cone axis 18 and that of cavity 30 will cause object 10 to wedge or jam without seating itself properly. Attempts to force object 10 into cavity 30 when misalignment exists will fail. If object 10 and cavity 30 are aligned properly before insertion begins, however, then only a small force is necessary to seat object 10 within cavity 30.

In contrast, when apex angle 44 is large, it is easy to locate the top opening of cavity 30 with point 24 of cone-shaped object 10. Angular misalignments cause negligible problems and imprecise, automated equipment and fabrication methods will suffice. A combination of friction and the large apex angle will increase, however, the insertion forces required to seat object 10.

Thus, a mid-range apex angle 44 which is neither large nor small is best. Preferably, apex angle 44 is between ten and forty degrees; thirty degrees has proven optimal for one particular construction of the present invention. Such an angle renders the top opening of cavity 30 easy to locate with point 24 of cone-shaped object 10, minimizes wedging or jamming, and reduces friction forces so that only small insertion forces are required to seat object 10.

The ease of obtaining relative planar orientation of two members being connected in a structure is a function of the cross-sectional geometry of the connector. As the cross-section of the connector approaches a circle, the connection does not present a preferred orientation to the structural members. Rather, the connection will show insertion characteristics similar to those of circular cones having large apex angles. As the elliptical cross-section of the connector approaches a line, the cone offers significant orientational preference. Such connectors will have characteristics like those of circular cones with small apex angles. The oblique or right nature of the object 10 provides additional orientational preference.

Figure 3:
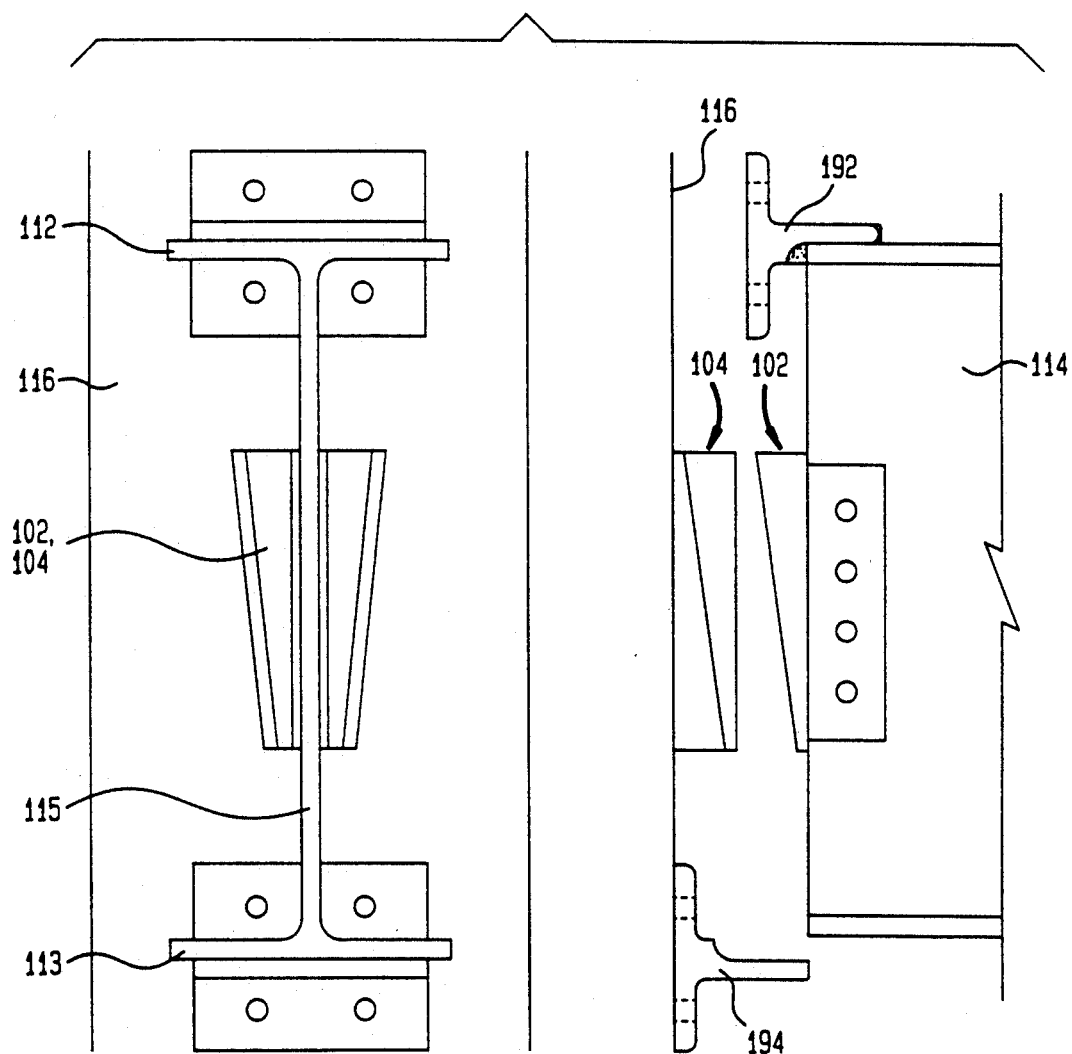
FIG. 3 provides rear and side views of a keystone connector with shop-attached accessories.
Figure 4:
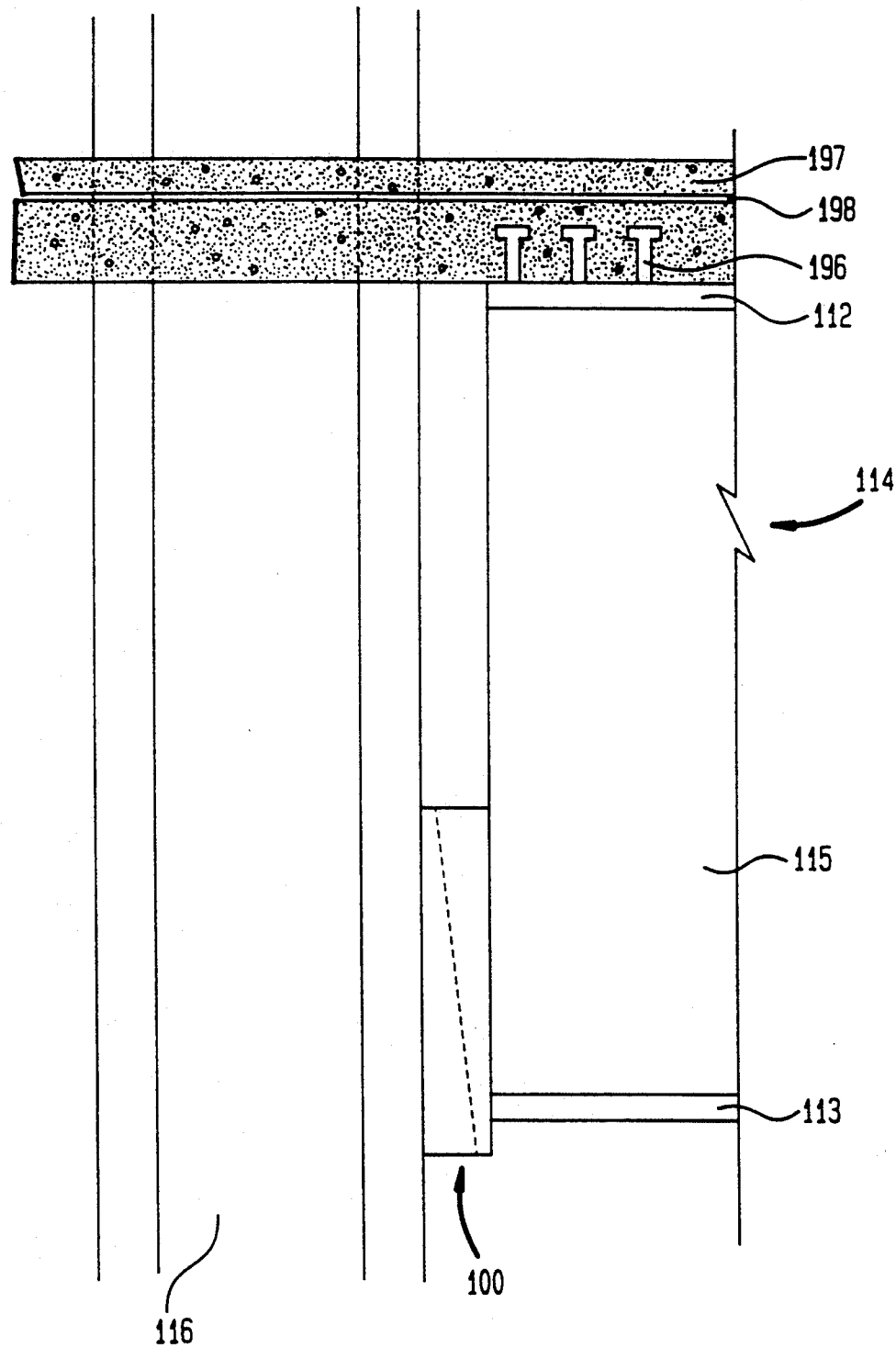
FIG. 4 shows variations in the use and positioning of the keystone connector of the present invention, namely a composite action of the beam slab and a strategically placed keystone connector to create a partially rigid connection without field fastening.

Three embodiments of the present invention are discussed below: a keystone connector 100 shown in FIGS. 2a, 2b, and 2c (with variations shown in FIGS. 3 and 4); a modified shear connector 200 shown in FIG. 5 (with variations shown in FIGS. 6 through 13); and a modified node connector 300 shown in FIG. 14. Although the variations shown in FIGS. 3 and 4 are illustrated using the keystone connector, a modified shear connector could be substituted for the keystone connector. Similarly, although the variations shown in FIGS. 6 through 13 are illustrated using the modified shear connector, a keystone connector could be substituted for the modified shear connector.

All three embodiments are based on the relationship between object 10 and cavity 30 shown in FIG. 1 and all have geometries which exhibit cone-like behavior. The cone-shaped surfaces simply are replaced by inclined planes for the physical embodiments. Two, three, or four sets of inclined planes are suitable, although the number of sets can be greater.

A. The Keystone Connector

Figure 2A:
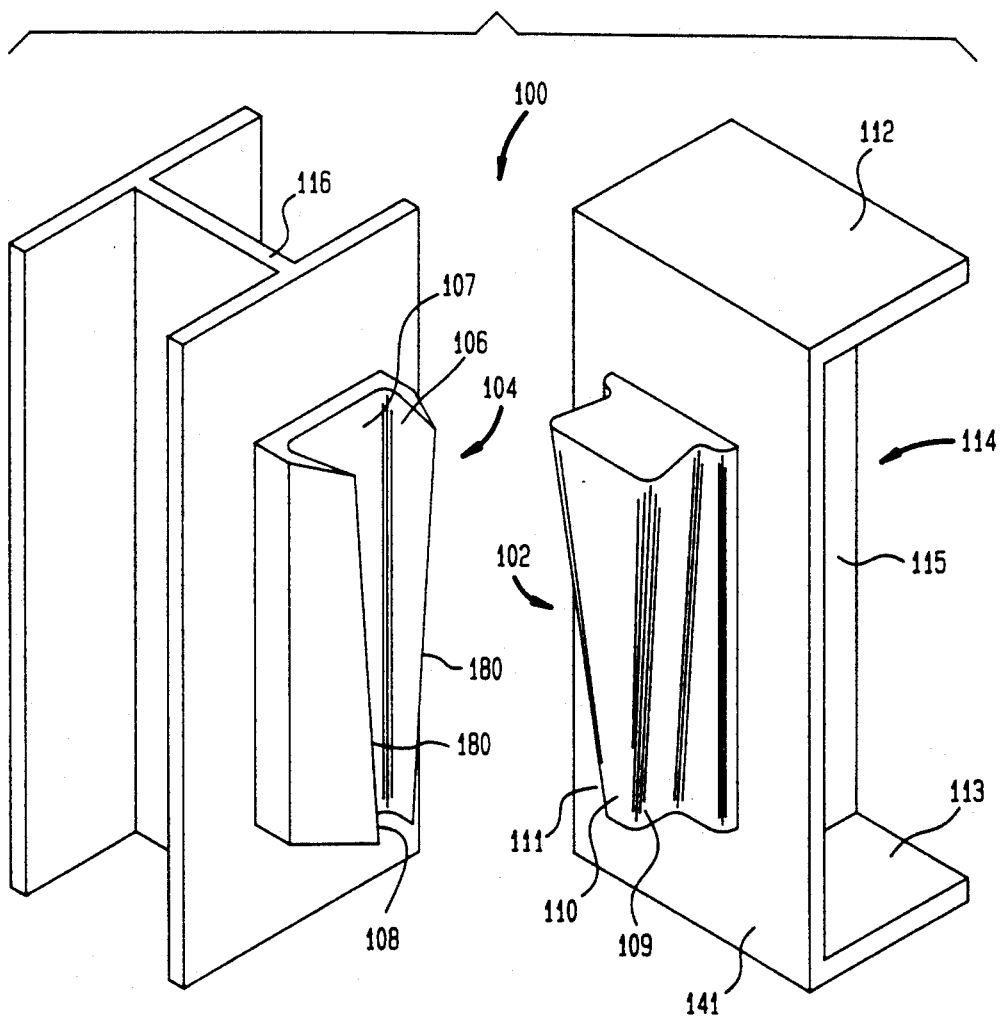
FIG. 2a is a perspective view of the first embodiment, a keystone connector, of the present invention.
Figure 2B:
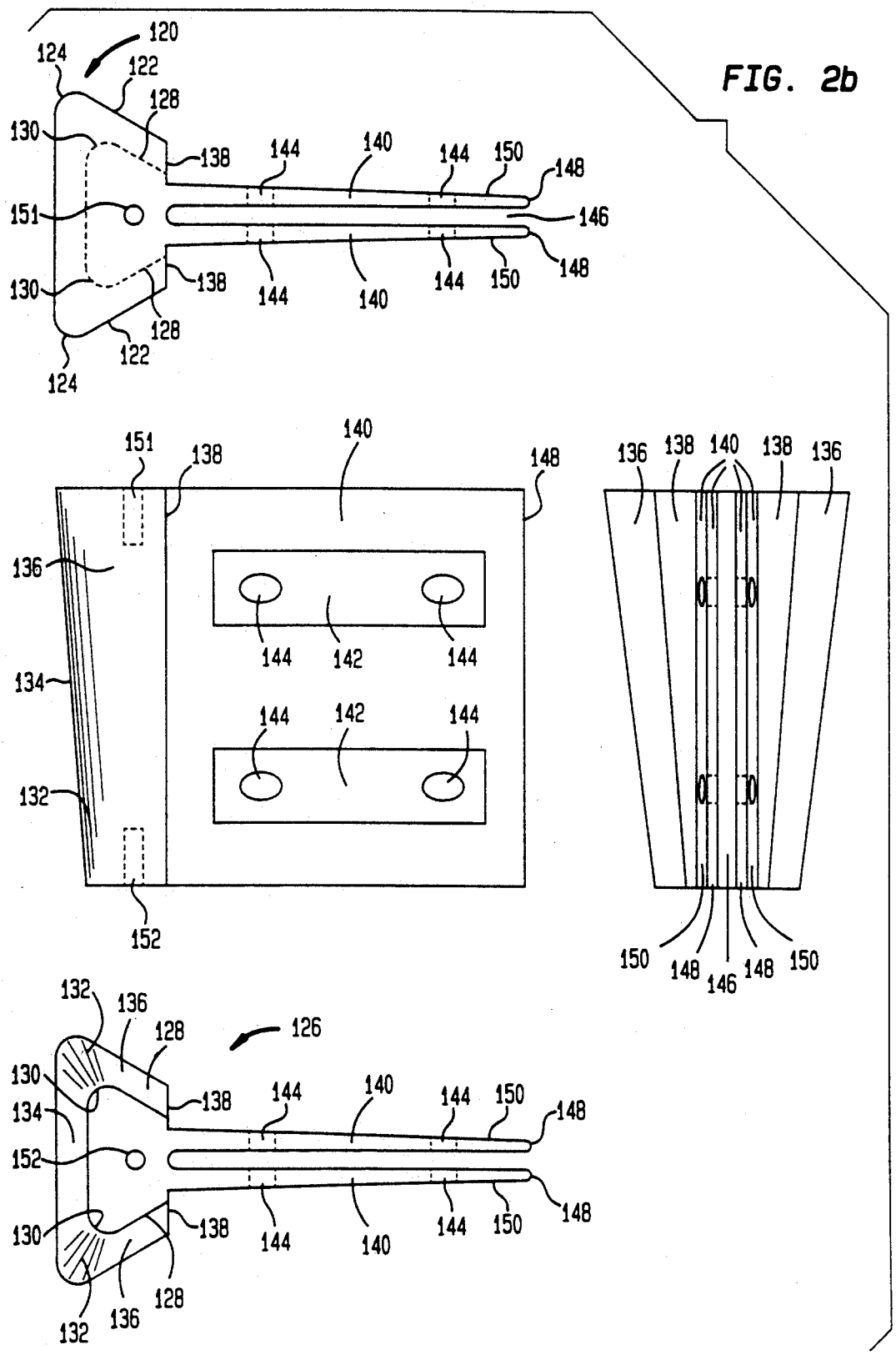
Figure 2C:
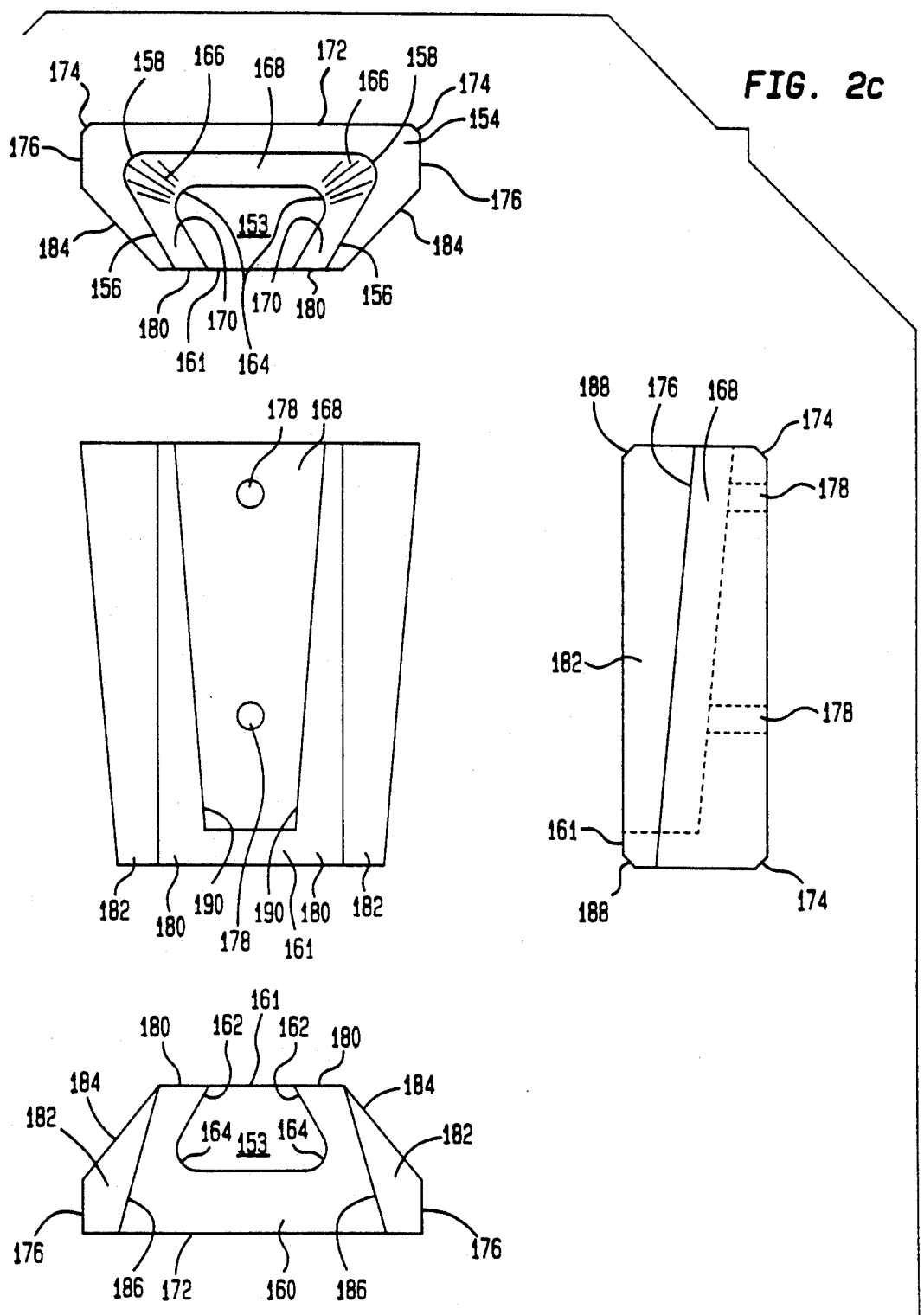

In the keystone connector 100 shown in FIGS. 2a, 2b, and 2c, all surfaces of the male 102 and female 104 parts which contact are inclined and load bearing. A minimum of three such inclined surfaces within each female part 104 (surfaces 106, 107, 108) and on the exterior of each male part 102 (surfaces 109, 110, 111) are necessary. Such surfaces are shown in FIG. 2a. The surfaces intersect each other and fillets are provided to decrease stress concentrations and ease manufacture.

For easy fabrication and to assure contact on all surfaces, the neck region of female part 104 is cut at a radius. Male part 102 is formed at a larger radius to provide clearance. Female part 104 has a greater sectional area at the critical locations and tapers in regions of low stress. Parts 102 and 104 may be cast and, if necessary, machined. The degree of fixation is provided by the amount of adjustment on the beam 114 and on the column 116.

Details of keystone connector 100 are provided below. Turning first to the cone-shaped object shown in FIG. 2b, the top surface 120 is bordered by two inclined contour lines 122 and two fillet lines 124. The bottom surface 126 has similar contour lines 128 and fillet lines 130. Between the two filleted surfaces 132 is a tilted surface 134. Two tilted and inclined surfaces 136 are bordered by bottom contour line 128, top contour line 122, filleted surfaces 132, and the vertical back surface 138. Surfaces 132, 134, 136, and 138 form the cone-shaped object. Surface 126 lies on the truncating plane.

The cone-shaped object is attached to the structural member (such as beam 114 in FIG. 2a) by two tabs 140 as shown in FIG. 2b or by a mounting plate 141 as shown in FIG. 2a. Each tab 140 has two flats 142 which are provided for registration. Each flat 142 has two elongated holes 144 useful as passageways for bolts if bolts are used to attach tabs 140 to beam 114. The space 146 between tabs 140 is provided to engage a portion of the structural member. Typically, the web 115 of beam 114 would engage space 146.

The ends 148 of tabs 140 are flanked by space 146 and an inclined surface 150. Inclined surface 150 allows tabs 140 to be positioned easily within crowded environments and gives tabs 140 lateral flexibility. Surface 138 may be located close to the structural member to provide an attachment surface for welding the cone-shaped object to the structural member (such as beam 114). The ends 148 and the top and bottom surfaces of tabs 140 may be used in a similar manner. A first hole 151 may be provided at the top of the cone-shaped object to secure a bolt. A second hole 152 similarly may be provided at the bottom of the cone-shaped object to secure another bolt.

The cone-shaped object engages the cone-shaped cavity 153 shown in FIG. 2c. The block which forms cavity 153 has a top surface 154 bordered by two inclined contour lines 156 and two fillet lines 158. The bottom surface 160 has similar contour lines 162 and fillet lines 164. A filleted surface 166 extends from each fillet line 158 to a fillet line 164. Between the two filleted surfaces 166 is a tilted surface 168. Two tilted and inclined surfaces 170 are bordered by bottom contour lines 162, top contour lines 156, filleted surfaces 166, and vertical cavity 153. Surfaces 166, 168, 170, and the edges 190 form the cone-shaped cavity 153. Surface 160 is the truncating plane.

The block forming cone-shaped cavity 153 is attached to the structural member (such as column 116 in FIG. 2a) by a back surface 172. Back surface 172 is typically welded directly to column 116 or to a mounting plate (not shown) which can, in turn, be bolted or welded to column 116. Beveled surfaces 174 between back surface 172 and the side surfaces 176 may be provided to ease placement of a weld bead around back surface 172 when back surface 172 is attached to the mounting plate or column 116. Through holes 178 may be provided to facilitate the fabrication process.

The front surfaces 180 are placed to allow clearance between the front of the block defining cavity 153 and the structural member (e.g., beam 114) attached to the cone-shaped object. Side surfaces 182 are inclined and tilted to provide clearance and sufficient material for a strong connector. Contour lines 184 are provided at the intersection of top surface 154 and side surfaces 182. Similarly, contour lines 186 are provided at the intersection of bottom surface 160 and side surfaces 182. Contour lines 162 and 186, fillet lines 164, and the bottom edges of front surfaces 180 lie on the truncating plane. Fillet 188 provides additional clearance for erection. The distance between edges 190 is largest at top surface 154 and smallest at bottom surface 160.

The inherent flexibility of the two prongs, each defined by the material and geometry bounded by surfaces 154, 160, 170, 180, and 182, and the inclination and tilt of the surfaces of the cone-shaped object and cavity provide a self-locking feature. Surfaces 132, 134, and 136 of the cone-shaped object and surfaces 166, 168, and 170 of the cone-shaped cavity may be treated (for example, with an elastomer) to change the damping and stiffness properties of the connector and, hence, the properties of the structural frame.

A bottom plate 161 may be attached to the bottom of the block defining cavity 153 by welding along contour lines 162 and 186, fillet lines 164, front surfaces 180, and back surface 172. Bottom plate 161 may contain a hole for insertion of a bolt or pin into the area between contour lines 162, fillet lines 164, and cavity 153. Bottom plate 161 does not carry load; rather, bottom plate 161 stiffens surfaces 170 and houses the bolt or pin. The bolt or pin would be used with second hole 152 (see FIG. 2b) to secure the cone-shaped object within the cone-shaped cavity and enhance the self-locking feature. Other methods which might be used to secure the cone-shaped object within the cone-shaped cavity include welding surfaces of the former to surfaces of the latter or placing pins or bolts through or between such surfaces.

A top plate with center hole (both not shown) may be placed above the engaged connection and used with a bolt and first bolt hole 151 to disengage the connection for tolerance adjustment and disassembly.

Keystone connector 100 can be applied effectively to different structural needs by using it in conjunction with other details. A rigid connection is shown in FIG. 3 which combines connector 100 with shop-attached accessories, which may include flange tees, angles, clips, plates and the like, such as top accessory 192 and bottom accessory 194. Accessories 192 and 194 do not impede the slip-in-place erection and, because connector 100 and the beveled feature of bottom accessory 194 are precise, on-site welding of the flanges is possible.

Figure 3A:
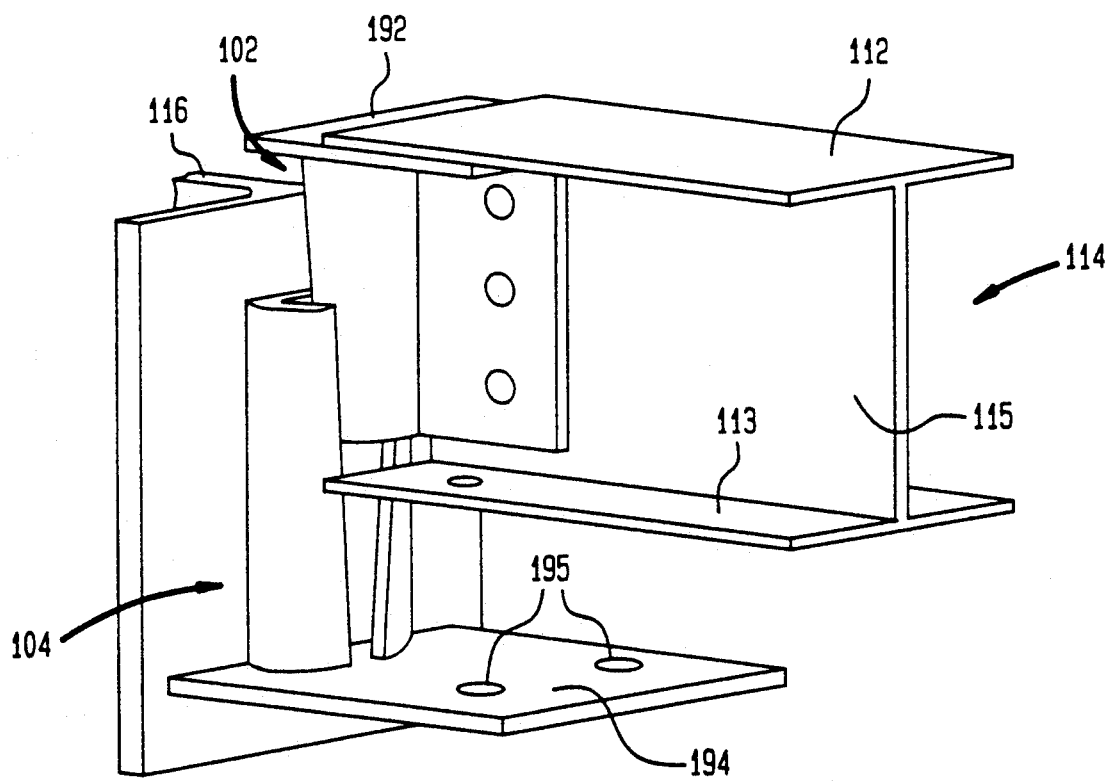
FIG. 3a is a perspective view of the partially engaged keystone connector with integral accessories.

As shown most clearly in FIG. 3a, accessories 192 and 194 may be made an integral part of keystone connector 100. For example, top accessory 192 may be an integral part of male part 102, which may then be shop-attached to beam 114, while bottom accessory 194 may be an integral part of female part 104, which may then be shop-attached to column 116. Holes 195 may be provided in bottom accessory 194 for mating with corresponding holes in lower flange 113 and positioning a securing screw (not shown). Because lower flange 113 and upper flange 112 are restrained in such a configuration, keystone connector 100 can transfer moment as well as vertical shear.

Alternatively, as shown in FIG. 4, connector 100 can be positioned near, and preferably at, the lower flange 113 of beam 114. Such strategic placement of connector 100 can be combined with a particular top configuration to create a partially rigid connection without field fastening. Such a top configuration is illustrated in FIG. 4.

Shear mounts 196 may be affixed (typically welded) to the top of upper beam flange 112. Shear mounts 196 are typically rods with tabs. A slab 197, usually of concrete, engages shear mounts 196. Embedded in slab 197 are steel reinforcing bars 198 for tension. Shear mounts 196, slab 197, and reinforcing bars 198 form the top configuration. When a building is completed which combines connector 100 with the top configuration as shown, connector 100 carries compression loads and immediately above connector 100 the top configuration carries tension. Thus, a composite action of the top configuration and a strategically placed keystone connector 100 creates a partially rigid connection without field fastening.

B. The Modified Shear Connector

Figure 5:
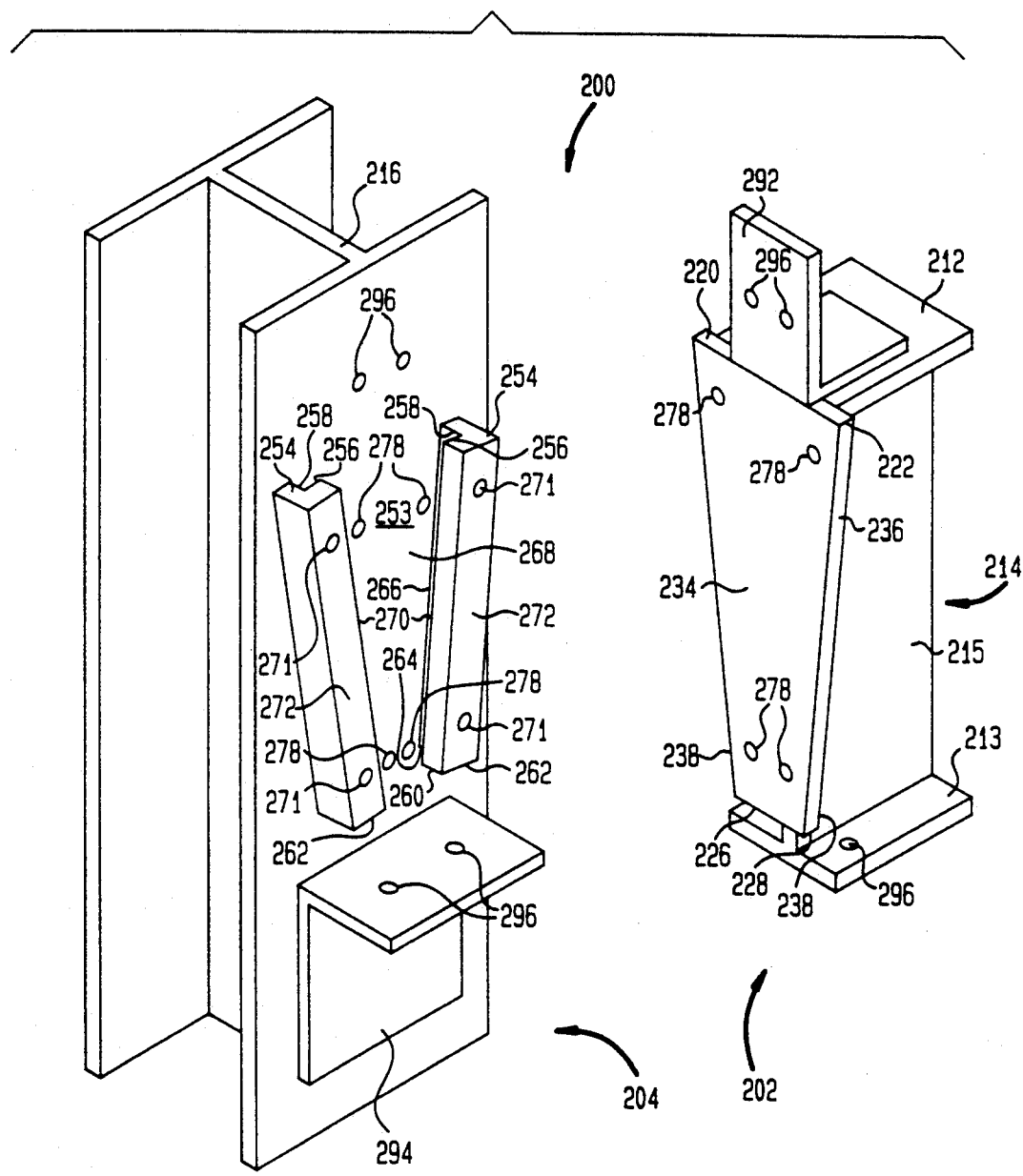
FIG. 5 is a perspective view of the second embodiment, a modified shear connector, of the present invention.

In the modified shear connector 200 shown in FIG. 5, male part 202 has external surfaces which contact corresponding surfaces within female part 204. Specifically, side inclined surfaces 236, back surface 238, and front surface 234 of male part 202 contact, respectively, corresponding first inclined surfaces 266, second inclined surfaces 270, and rear surface 268 of female part 204. Each of these surfaces may bear loads. Details of modified shear connector 200 are provided below.

Turning first to the cone-shaped object, which corresponds to male part 202, the top surface 220 is bordered by two contour lines 222. The bottom surface 226 has similar contour lines 228. Two side inclined surfaces 236 are bordered by bottom contour lines 228, top contour lines 222, and vertical back surface 238. Between the two surfaces 236 is a front surface 234. Surfaces 234, 236, and 238 form the cone-shaped object. Surface 226 lies on the truncating plane.

Cone-shaped object 202 may be attached to the structural member (such as beam 214) by two tabs in a manner similar to that used for keystone connector 100 discussed above and illustrated in FIG. 2b.

Cone-shaped object 202 engages the cone-shaped cavity 253. The block which forms cavity 253 has a top surface 254 bordered by two sets of contour lines 256 and 258. The bottom surfaces 260 have similar contour lines 262 and 264. A first surface 266 extends from each line 258 to line 264. Surfaces 266 may be wider at their tops than at their bottoms. If surfaces 266 are wider at their tops, then side inclined surfaces 236 of male part 202 may also be, but need not be, wider at their tops than at their bottoms.

Between the two first surfaces 266 is a rear surface 268. Two second surfaces 270 are bordered by bottom contour lines 262, top contour lines 256, surfaces 266, and vertical cavity 253. Contour lines 264 and surfaces 266, 268, and 270 form cone-shaped cavity 253. Bottom surfaces 260 are the truncating plane.

The block forming cone-shaped cavity 253 may be provided by attaching two tilted angle irons 272 to the structural member (such as column 216). The rear surface of irons 272 is typically welded directly to column 216 or to a mounting plate (not shown) which can, in turn, be bolted or welded to column 216. Bolt holes 278 also may be provided in front surface 234 of male part 202 and, correspondingly, in rear surface 268 of female part 204 for attachment purposes.

Modified shear connector 200 can be applied effectively to different structural needs by using it in conjunction with other details. A rigid connection is shown in FIG. 5 which combines connector 200 with shop-attached accessories 292 and 294. Provided with elongated holes 296, accessories 292 and 294 can be made adjustable relative to column 216. Moreover, accessories 292 and 294 do not impede the slip-in-place erection. Because connector 200 and accessories 292 and 294 are both precise and adjustable, on-site welding of the flanges is possible.

Figure 6:
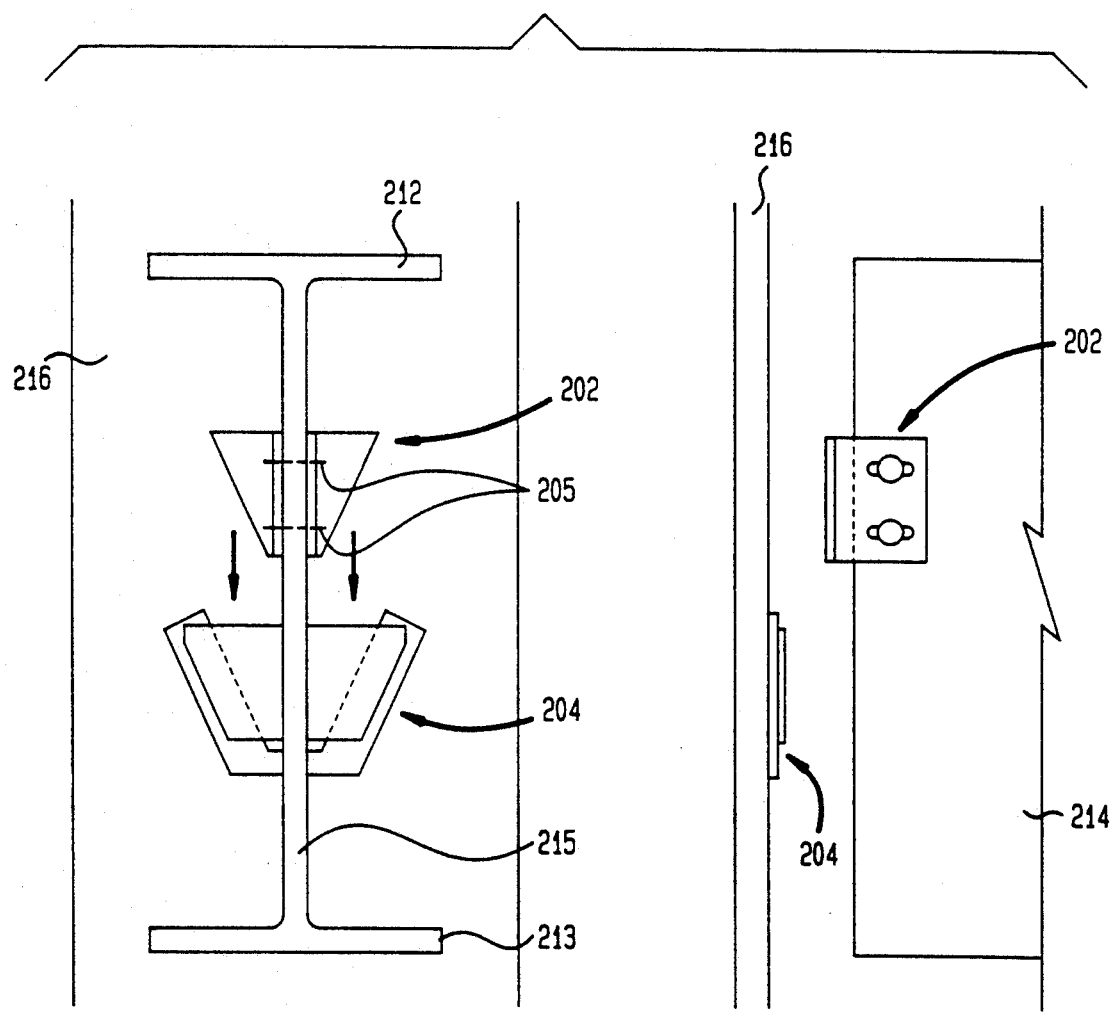
FIG. 6 shows a modified shear connector of the present invention used solely as an erection aid.
Figure 7:
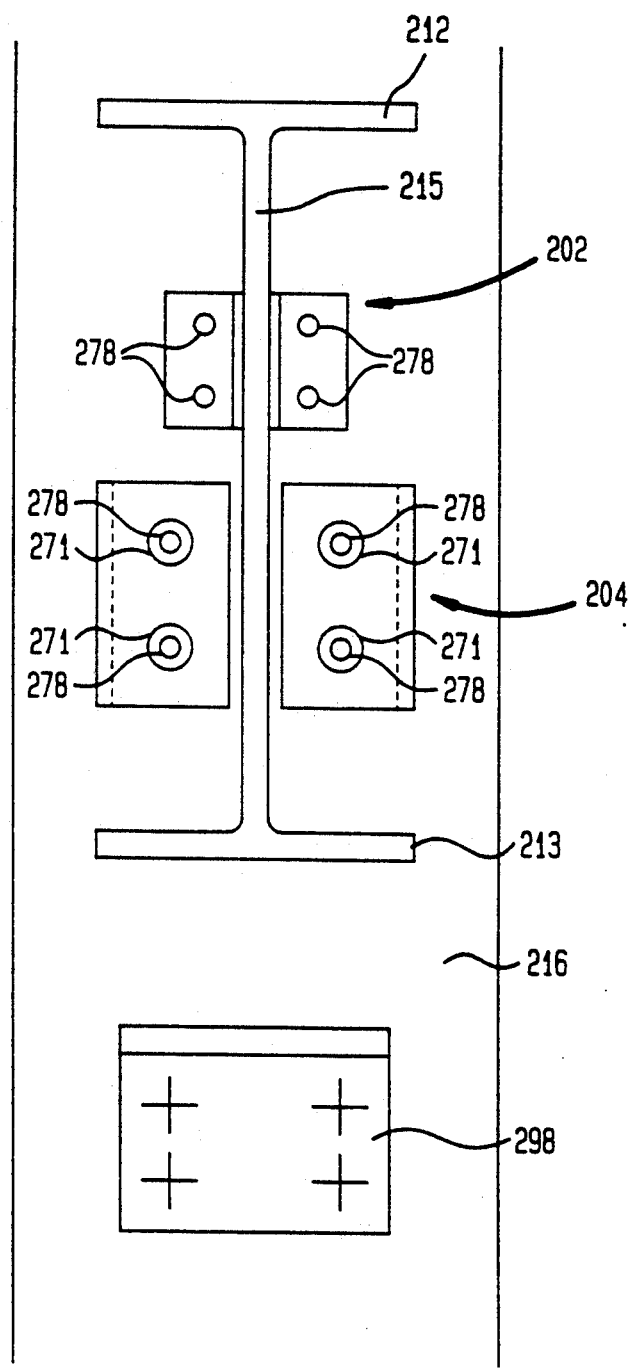
FIG. 7 shows a beam web containment-type erection aid.
Figure 8:
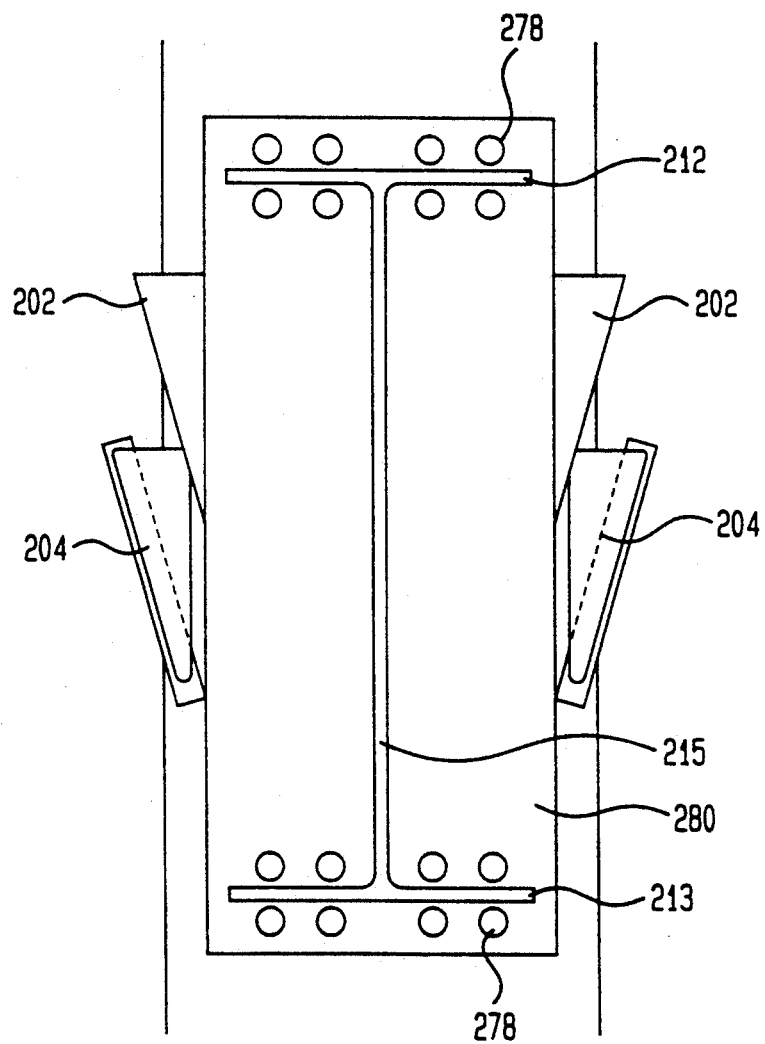
FIG. 8 shows an erection aid for a moment connection, in which the male parts of the connector form side wings on a plate attached to the beam and the female parts of the connector form side slots on the column, as an alternative to the traditional end-plate moment connection.

FIGS. 6, 7, and 8 show modified shear connector 200 used solely as an erection aid; the contact surfaces 234, 236, and 238 of male part 202 and the corresponding contact surfaces 268, 266, and 270 within female part 204 are not designed, when connector 200 is only an erection aid, to bear structural loads. FIG. 6 shows that female part 204 can be made as a single piece-in contrast to the construction of female part 204 shown in FIG. 5. A single piece construction is easier to make.

FIG. 6 also shows that, for the erection aid, male part 202 is attached only to the web 215 and not to the upper flange 212 or lower flange 213 of beam 214. Moreover, bolts 205 may be used to attach male part 202 instead of a weld. As discussed above, connector 200 can be attached with flange connections such as angles, tees, or plates. All of the components can be mass-produced. The one-piece female part 204 allows for a superior weld pattern on column 216 and permits quick and accurate fabrication layout.

FIG. 7 shows a containment-type erection aid. In this case, a seat 298 provides complete support during erection; the components of female part 204 are oversized and provide only stability to beam 214. An erection pin (not shown) can be inserted through bolt holes 278 if necessary. This type of erection aid is versatile because it can cover a wide range of structural needs. Accessory 292 such as a clip angle can be attached at the top of upper beam flange 212 for a simple connection. Female part 204 may have access holes 271 to allow part 202 to be bolted to column 216, thus creating a partial-moment connection. Seat 298 may be a suitable accessory 294 if a rigid connection is desired.

FIG. 8 shows an erection aid which provides an alternative to the traditional end-plate connection. As it currently exists, the traditional end-plate connection is potentially dangerous; it risks injury to the erectors. The modification shown, in which male parts 202 form side wings on a plate 280 attached to the end of beam 214 and female parts 204 form side slots on column 216, eliminates such dangers. Because the erection aid is designed to carry completely the erection loads, there is no need for erection bolts. The structural bolts used can be placed, at the erector's convenience, in a safer environment without concern for beam support. Once those structural bolts are in place, the erection aids can be burned or knocked off if they pose an obstruction.

Figure 9:
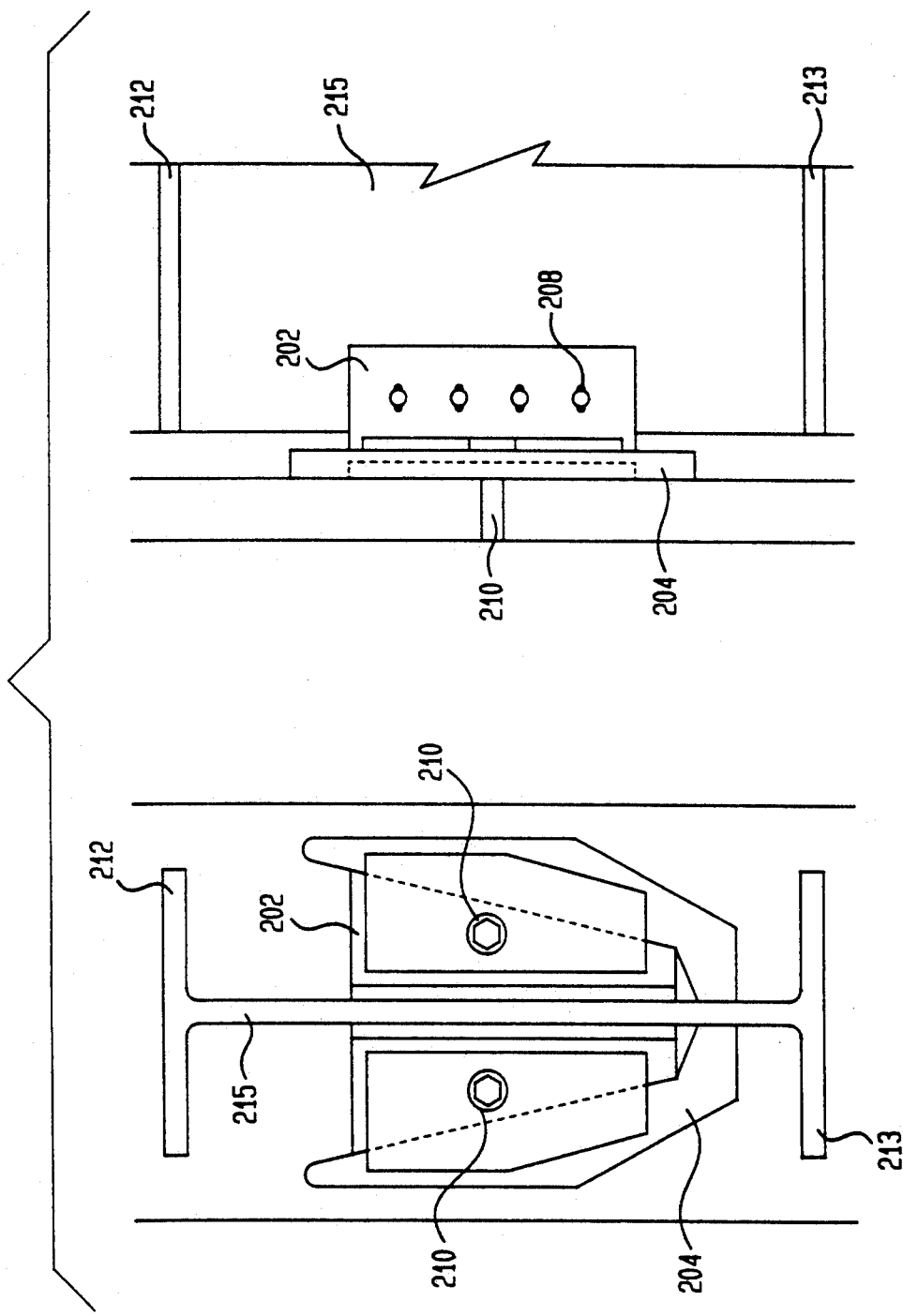
FIG. 9 shows a modified shear connector of the present invention designed to carry structural loads.

When modified shear connector 200 is designed to carry structural loads, some of its features become larger. For example, the depth of connector 200 is much larger when connector 200 will carry shear, as shown in FIG. 9, than that of the erection aid. The larger depth is required because the connection has more bolts 208 along beam web 215 to carry the design shear. The contact surfaces 234, 236, and 238 of male part 202 and the corresponding contact surfaces 268, 266, and 270 within female part 204 must be smoother and form a tighter fit when connector 200 carries shear than when connector 200 is applied as an erection aid. Smoothness and fit are necessary to limit torsional moments on the face of column 216. Because connector 200 is the complete connection, anchoring bolts 210 are required on the face of column 216 to prevent beam 214 from sliding longitudinally. Anchoring bolts 210 are placed at the same level as the neutral axis of beam 214 to maintain the simple beam action.

Figure 10:
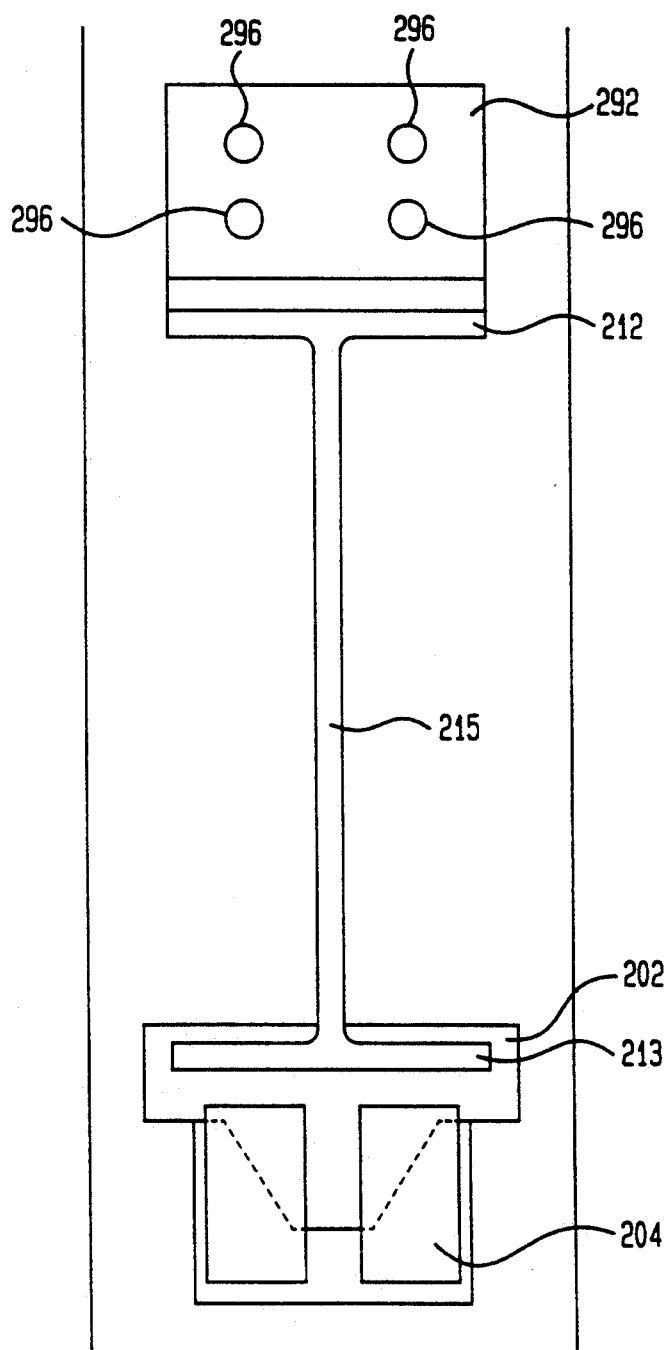
FIG. 10 illustrates an alternative method of forming a shear connection in which a modified shear connector of the present invention is used to secure the lower flange of a beam and an accessory secures the upper flange of that beam.
Figure 10:
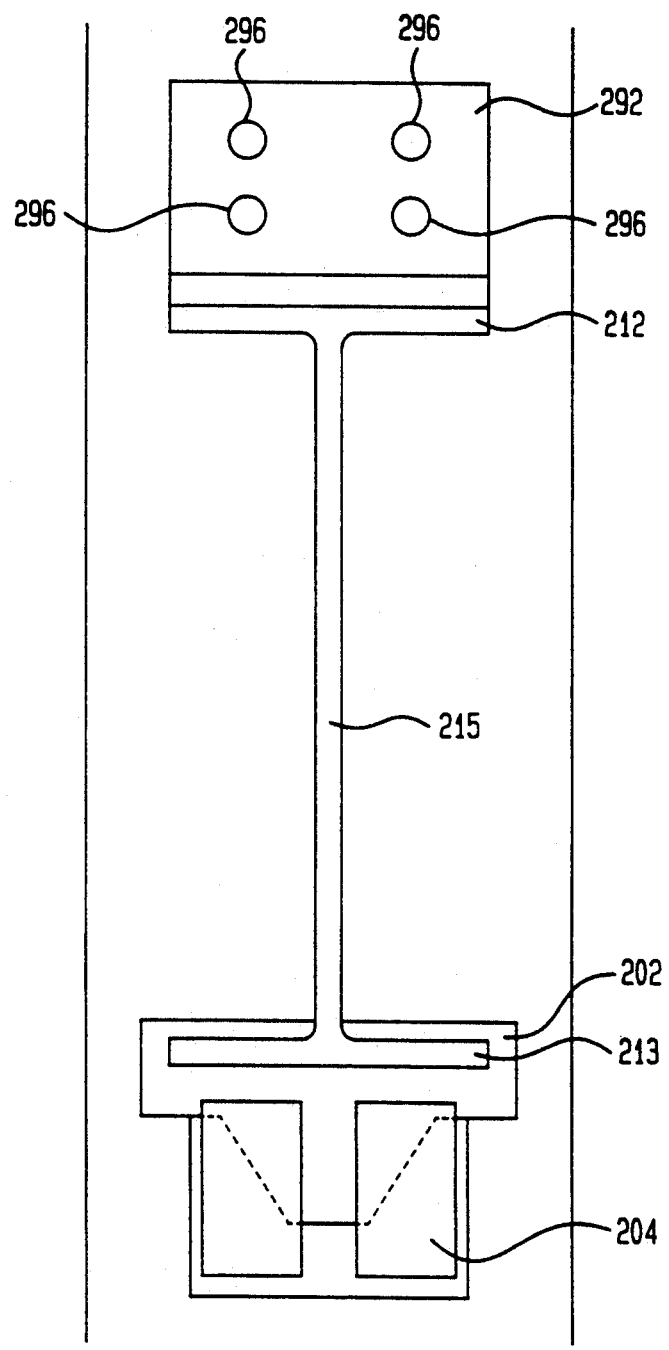

A less expensive method of forming a shear connection is to use connector 200 to secure lower beam flange 213 and an accessory 292 (such as a top clip) to secure upper beam flange 212, as shown in FIG. 10. Because shear is not developed through web 215, a large depth for connector 200 is unnecessary. Male part 202 need not be provided with double angles; rather, it can be a plate welded to lower flange 213. Beam 214 would be positioned from the side, then dropped down using a tab for lateral stability.

Figure 12:
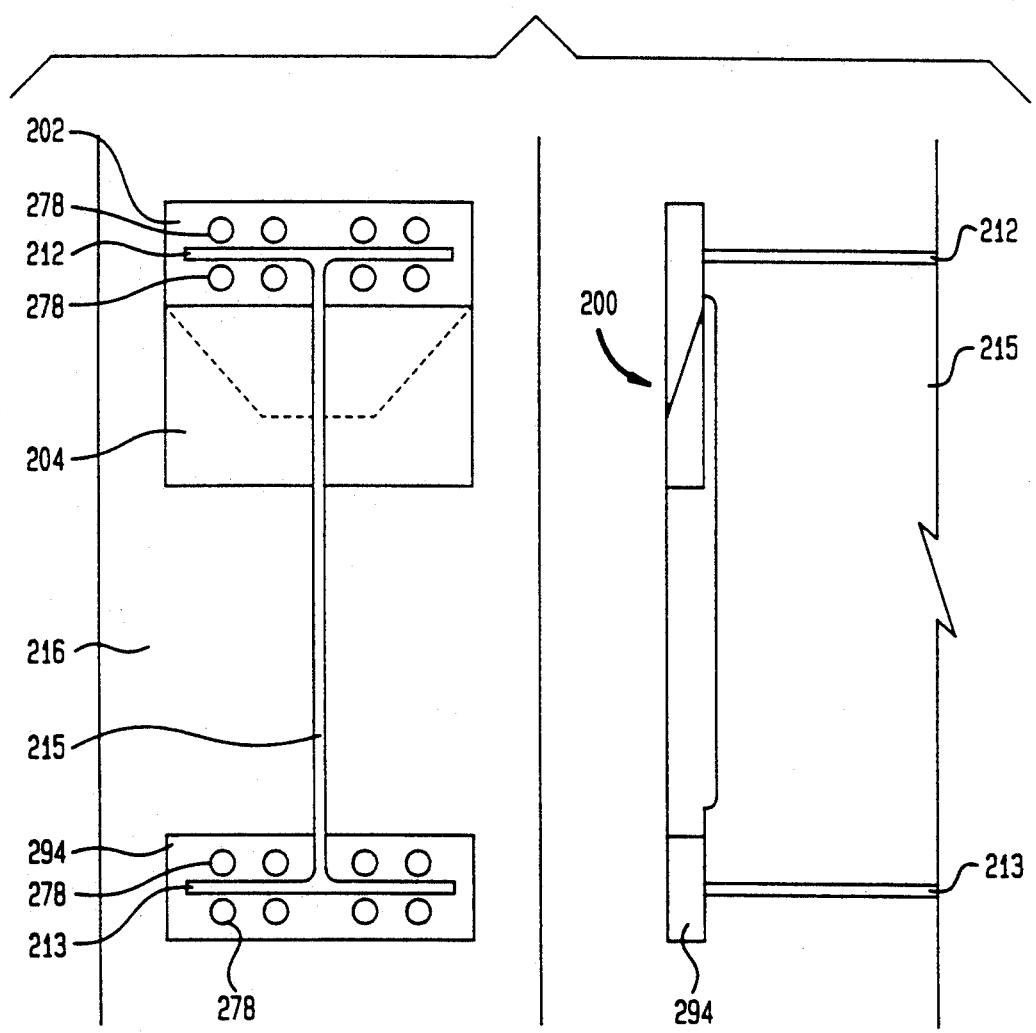
FIG. 12 shows a partial-moment connection in which an accessory such as a flange tee or angle secures the lower flange of the beam and the modified shear connector of the present invention positions the upper flange of the beam.
Figure 13:
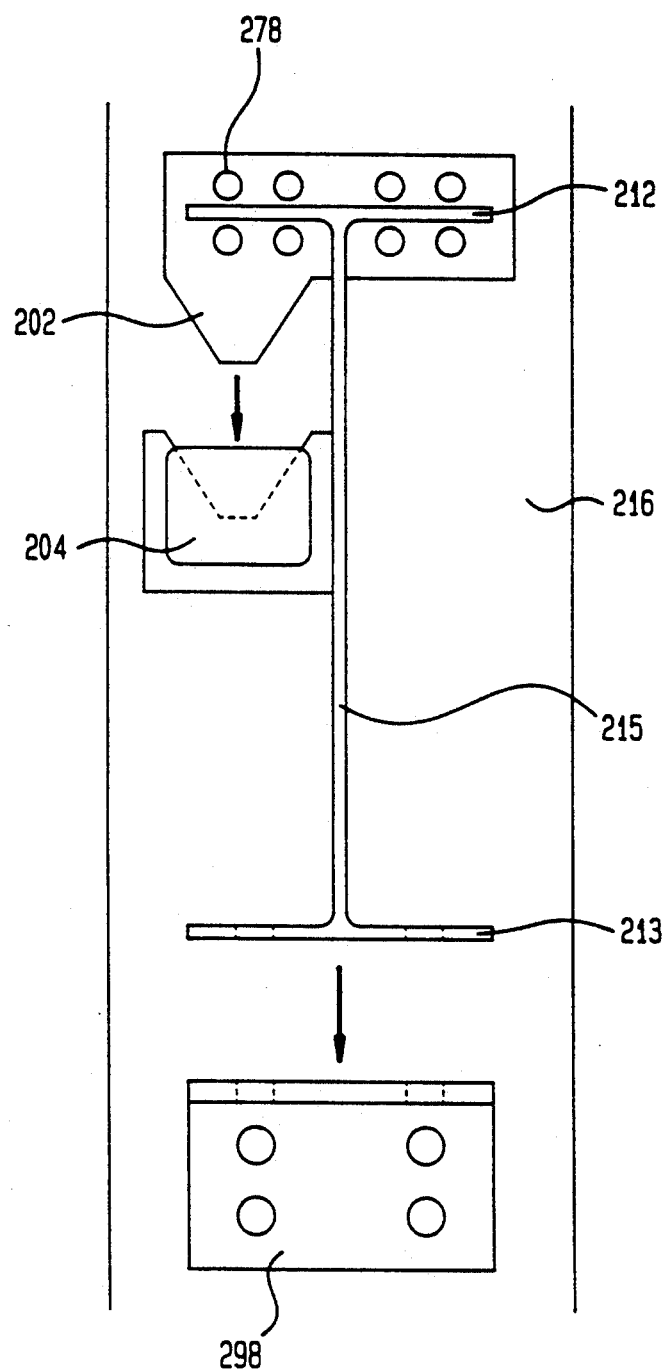
FIG. 13 shows a partial-moment connection in which two modified shear connectors of the present invention are positioned on opposite ends of a beam, either on the same side or on opposite sides of the beam web.
Figure 11:
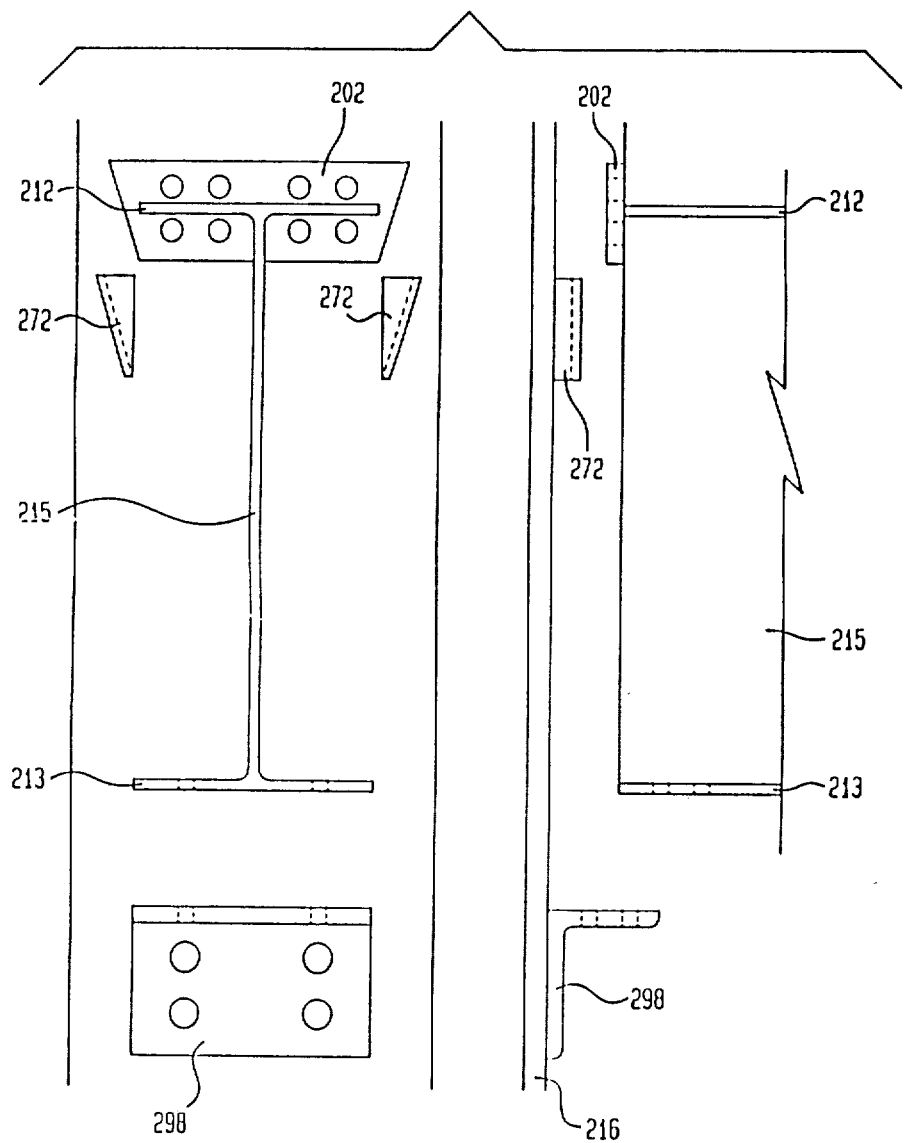
FIG. 11 shows a partial-moment connection in which the modified shear connector of the present invention forms a containment piece for stability and a seat provides support for the beam.

A partial-moment connection can be made by placing a modified shear connector 200 on upper flange 212 of beam 214 and a traditional connector on lower flange 213 of beam 214. Such a connection is illustrated in FIGS. 11, 12, and 13. The advantages of these connections are that they provide some moment resistance, are relatively inexpensive, and can be erected fairly easily. Despite their advantages, partial-moment connections have not gained widespread acceptance. The absence of an easily used design procedure likely prevents such acceptance. That problem is exacerbated when load reversal occurs: asymmetry about the neutral axis may make the hysteric behavior of the connection difficult to predict. These problems become less formidable, however, as computers advance.

In FIG. 11, female part 204 is attached to column 216 by two tilted angle irons 272. Female part 204 need be nothing more than a containment piece for stability; support for beam 214 is provided by seat 298. Bolts can be inserted later, following placement, at a safer time.

The connection shown in FIG. 12 requires tight tolerances to allow beam 214 to reach the center of column 216 without creating clearance problems for web 215. Accessory 294 is positioned to receive lower beam flange 213. Thus, no field welding is required and the connection has a high moment capacity.

The connection shown in FIG. 13 can be twisted into place if two connectors 200 are positioned on opposite sides and opposite ends of beam web 215. (Note that only one connector 200 is illustrated, to the left of web 215 and at the end of beam 214 in the plane of the paper; the second connector 200 would be placed to the right of web 215 and out of the paper plane closer to the reader in FIG. 13.) Such placement requires that column 216 be pulled back slightly to allow beam 214 to twist into position. If two connectors 200 are both placed on the same side of web 215, beam 214 can be side-mounted. Seat 298 is intended to provide the means of support; connectors 200 act only as guides.

C. The Modified Node Connector

Figure 14:
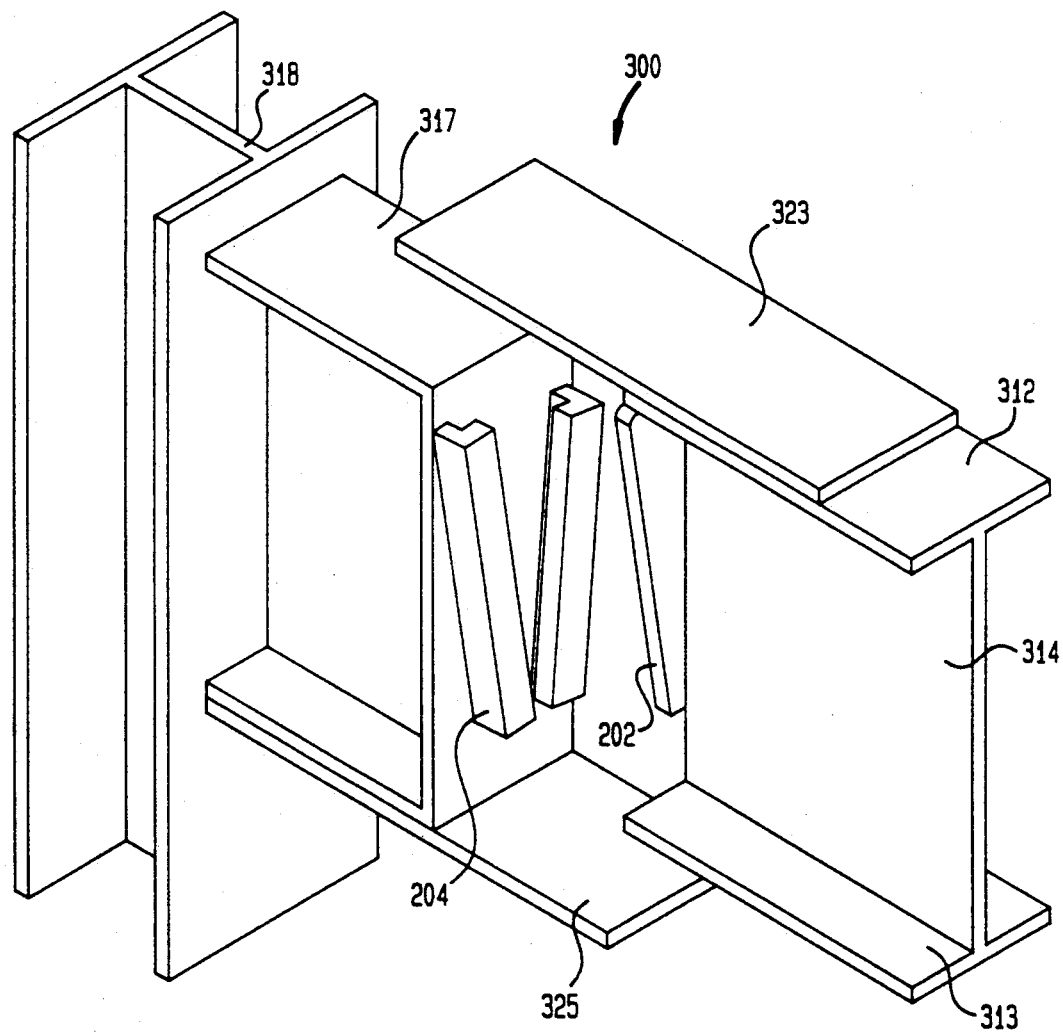
FIG. 14 is a perspective view of the third embodiment, a modified node connector, of the present invention.

In the modified node connector 300 of the present invention, shown in FIG. 14, the keystone connector 100 or the modified shear connector 200 is used as part of a structural node 318. Structural node 318 is a conventional construction tool (typically a shortened column) which allows attachment of one, two, three, or four beam extensions 317. FIG. 14 shows structural node 318 with a single beam extension 317 for simplicity. Although keystone connector 100 could be used, modified shear connector 200, having male part 202 and female part 204, is illustrated.

Male part 202 of connector 200 is secured to beam 314 and female part of connector 200 is secured to beam extension 317. Flange extensions 323 and 325 on upper beam flange 312 and lower beam flange 313, respectively, are provided for moment-carrying ability. Modified node connector 300 can be formed using all of the features defined by FIGS. 1 through 13.

Although the invention is illustrated and described herein as embodies in a structural connector used to interconnect at least a first and a second member which includes a cone-shaped male part having an elliptical cross-section attached to the first member and a female part forming a correspondingly elliptical cone-shaped cavity attached to the second member and adapted to receive the male part, whereby upon receipt of the male part within the cavity of the female part the first and second members are interconnected, the invention is nevertheless not intended to be limited to the details shown. Rather, various modifications may be made in the details within the scope and range of equivalents of the claims and without departing from the spirit of the invention. Although the use of the invention has been described within the construction industry, for example, in particular on buildings using structural steel, a person of ordinary skill in the art could infer uses in other industries and other applications.

What is claimed is:

1. An improved adjustable keystone structural connector useful for automated building construction to interconnect at least a first and a second member which comprises:

a cone-shaped male part with an approximately elliptical cross section attached to said first member and having:
   (a) a vertical back face having a top and a bottom,
   (b) a front face having a top and a bottom tapered so that its width is greatest at said top and least at said bottom and inclined inwardly from said top toward said vertical back face,
   (c) a pair of side faces each having a rear, a front, a top, and a bottom and inclined outwardly and upwardly, said side faces joined at said respective rear to said vertical back face and at said respective front to said front face,
   (d) a top face, having a rear, a pair of sides, a front, and a pair of fillets forming said approximately elliptical cross section to decrease stress concentrations and ease manufacture and erection, wherein said top face is connected at said rear to said top of said vertical back face, on said sides to said tops of said side faces, and on said front to said top of said front face, and
   (e) a bottom face, having a rear, a pair of sides, a front, and a pair of fillets forming said approximately elliptical cross section to decrease stress concentrations and ease manufacture and erection, wherein said bottom face connected at said rear to said bottom of said vertical back face, on said sides to said bottoms of said side faces, and on said front to said bottom of said front face; and a female part having:
   (a) a back surface attached to said second member, and
   (b) a vertical front surface, said back surface and said front surface confining therebetween an approximately elliptical cone-shaped cavity including:
      (i) a tilted back surface adapted to engage said front face of said male part upon receipt of said male part within said cavity of said female part, and
      (ii) a pair of side surfaces each having rear side edges and inclined outwardly and upwardly, said side surfaces joined on said respective rear side edges to said tilted back surface, each of said side surfaces adapted to engage said respective side face of said male part upon receipt of said male part within said cavity of said female part;

said female part adapted to receive said male part within said cavity wherein upon receipt of said male part within said female part said back surface of said female cavity engages said front face of said male part and said pair of side surfaces of said female cavity engage said pair of side faces of said male part to carry vertical shear loads without additional load-carrying elements, said vertical front surface of said female part spaced away from said first member when said male and female parts are engaged to facilitate adjustment, whereby upon receipt of said male part within said cavity of said female part said first and said second members are interconnected.

2. An improved structural connector as claimed in claim 1 wherein said male and female parts are adapted to be secured to their respective said members away from the erection site at which said members are interconnected.

3. An improved structural connector as claimed in claim 1 wherein said male part is adapted to be received within said cavity of said female part at the erection site at which said members are interconnected.

4. An improved structural connector as claimed in claim 1 wherein said female part is positioned at one end of said second member along a center of gravity of said second member to assure stability.

5. An improved structural connector as claimed in claim 4 wherein said male part is positioned at one end of said first member along a center of gravity of said first member to assure stability.

6. An improved structural connector as claimed in claim 1 wherein said female part is positioned at a midpoint of said second member at a center of gravity to assure stability.

7. An improved structural connector as claimed in claim 6 wherein said male part is positioned at one end of said first member along the center of gravity of said first member to assure stability.

8. An improved structural connector as claimed in claim 1 wherein said cone-shaped male part and said cone-shaped cavity each define a common apex angle, said angle predetermined to reduce the effects of wedging and jamming while also decreasing the effects of precision and tolerance requirements during reception of said male part within said cavity.

9. An improved structural connector as claimed in claim 8 wherein said apex angle is about ten degrees.

10. An improved structural connector as claimed in claim 1 wherein said first member has an upper flange, a lower flange, and a web.

11. An improved structural connector as claimed in claim 10 wherein:
said male part is attached to said web of said first member;
a first flange tee shop-attached to said upper flange of said first member interconnects said upper flange of said first member to said second member;
a second flange tee shop-attached to said second member interconnects said lower flange of said first member to said second member; and
said structural connector forms a rigid connection between said first member and said second member.

12. An improved structural connector as claimed in claim 10 wherein:
said male part is attached to said first member near said lower flange of said first member;
said upper flange of said first member is affixed to a top configuration, said top configuration including:
(a) a plurality of shear mounts mounted to said upper flange of said first member,
(b) a concrete slab engaging said shear mounts, and
(c) steel reinforcing bars embedded in said slab; and
said structural connector forms a partially rigid connection between said first member and said second member without field fastening.

13. An improved structural connector as claimed in claim 10 wherein said male part is bolted only to said web of said first member and said structural connector is used solely as an erection aid.

14. An improved structural connector as claimed in claim 10 wherein said male part is attached to said lower flange of said first member and an accessory attaches said upper flange of said first member to said second member to create a shear connection.

15. An improved structural connector as claimed in claim 10 wherein said male part is attached to said upper flange of said first member and an accessory attaches said lower flange of said first member to said second member to create a partial-moment connection.

16. An improved structural connector as claimed in claim 15 wherein said accessory is a seat.

17. An improved structural connector as claimed in claim 10 wherein said male part is attached to said upper flange of said first member at a first end of said first member on a first side of said web.

18. An improved structural connector as claimed in claim 17 wherein a second male part is attached to said upper flange of said first member at a second end of said first member on the opposite side of said web to create a partial-moment connection.

19. An improved structural connector as claimed in claim 17 wherein a second male part is attached to said upper flange of said first member at a second end of said first member on said first side of said web to create a partial-moment connection.

20. An improved structural connector as claimed in claim 1 wherein said male part has a mounting plate for attachment of said back face of said male part to said first member.

21. An improved structural connector as claimed in claim 20 wherein said first member has an end and said mounting plate of said male part is attached to said end of said first member.

22. An improved structural connector as claimed in claim 21 wherein said female part has a bottom plate attached to the bottom of said back surface, said pair of side surfaces, and said front surface, said bottom plate having a hole for insertion of a securing fastener.

23. An improved structural connector as claimed in claim 1 wherein said male part has a pair of tabs for attachment of said back face of said male part to said first member.

24. An improved structural connector as claimed in claim 23 wherein each of said tabs has at least one elongated hole adapted to receive a bolt for attachment of said tabs of said male part to said first member.

25. An improved structural connector as claimed in claim 1 wherein said female part has a mounting plate for attachment of said back surface of said female part to said second member.

26. An improved structural connector as claimed in claim 1 wherein said female part has a bottom plate attached to the bottom of said back surface, said pair of side surfaces, and said front surface.

27. An improved structural connector as claimed in claim 26 further comprising a fastener insertable into a hole in said bottom plate of said female part to secure said cone-shaped male part within said cone-shaped cavity.

* * * * *

UNITED STATES PATENT AND TRADEMARK OFFICE
CERTIFICATE OF CORRECTION

PATENT NO. : 5,244,300
DATED : September 14, 1993
INVENTOR(S) : Noel D. Perreira, et al Page 1 of 2

It is certified that error appears in the above-indentified patent and that said Letters Patent is hereby corrected as shown below:

In the Drawings:

Sheet 15 of 18, consisting of Fig. 10, should be deleted to be replaced with the drawing sheet, consisting of Fig. 11, as shown on the attached page.

Column 13, line 16, delete "embodies" and insert --embodied--;
        line 64, insert --is-- after "bottom face".

Signed and Sealed this

Twenty-first Day of June, 1994

Attest:

BRUCE LEHMAN

*Attesting Officer*   *Commissioner of Patents and Trademarks*